US009852016B2

(12) United States Patent
Griffith et al.

(10) Patent No.: US 9,852,016 B2
(45) Date of Patent: *Dec. 26, 2017

(54) DIAGNOSTIC HEARTBEATING IN A DISTRIBUTED DATA PROCESSING ENVIRONMENT

(71) Applicant: International Business Machines Corporation, Armonk, NY (US)

(72) Inventors: Douglas James Griffith, Georgetown, TX (US); Astrid Angela Jaehde, Austin, TX (US); Robert Scott Manning, Leander, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 583 days.

This patent is subject to a terminal disclaimer.

(21) Appl. No.: 14/471,068

(22) Filed: Aug. 28, 2014

(65) Prior Publication Data
US 2014/0372519 A1    Dec. 18, 2014

Related U.S. Application Data

(63) Continuation of application No. 13/296,407, filed on Nov. 15, 2011, now Pat. No. 8,903,893.

(51) Int. Cl.
*G06F 11/07* (2006.01)
*H04L 12/26* (2006.01)

(52) U.S. Cl.
CPC ...... *G06F 11/0709* (2013.01); *G06F 11/0757* (2013.01); *G06F 11/0763* (2013.01); *H04L 43/10* (2013.01); *H04L 43/50* (2013.01)

(58) Field of Classification Search
CPC .................................................. H04L 43/10
See application file for complete search history.

(56) References Cited

U.S. PATENT DOCUMENTS

| 5,353,412 | A  | * | 10/1994 | Douglas ............ G06F 15/17381 370/408 |
| 5,983,371 | A  | * | 11/1999 | Lord .................... G06F 11/0757 714/55 |
| 6,134,678 | A  | * | 10/2000 | Mahalingam ............. G06F 1/20 370/409 |
| 6,370,656 | B1 | * | 4/2002  | Olarig ................. G06F 11/0721 709/201 |

(Continued)

OTHER PUBLICATIONS

U.S. Appl. No. 13/296,419, patent prosecution, Nov. 26, 2013 Notice of Allowance.

(Continued)

*Primary Examiner* — Jimmy H Tran
(74) *Attorney, Agent, or Firm* — Garg Law Firm, PLLC; Rakesh Garg; Isaac Gooshaw

(57) ABSTRACT

A first component receives from a second component a set of diagnostic parameters to include in a diagnostic heartbeat packet, and information identifying a data communication protocol to be used for transmitting the diagnostic heartbeat packet. The diagnostic heartbeat packet is a packet comprising a header, a set of heartbeat parameters, and the set of diagnostic parameters. The first component sets a first diagnostic parameter in the set of diagnostic parameters to a first value, the first value being selected to detect a first soft network error condition. A soft network error condition is a network error condition that adversely affects transmission of packets having certain properties in the data communication network. The first component configures the diagnostic heartbeat packet for transmission using the specified data communication protocol and including the set of diagnostic parameters, and sends the diagnostic heartbeat packet to the second component.

16 Claims, 15 Drawing Sheets

(56) References Cited

U.S. PATENT DOCUMENTS

| | | | | |
|---|---|---|---|---|
| 6,460,149 B1* | 10/2002 | Rowlands | ............. | G06F 11/0709 711/114 |
| 6,581,166 B1* | 6/2003 | Hirst | ............. | H04L 69/40 714/4.4 |
| 6,675,243 B1* | 1/2004 | Bastiani | ............. | G06F 13/4291 710/105 |
| 6,820,221 B2* | 11/2004 | Fleming | ............. | G06F 11/0715 714/31 |
| 6,880,100 B2 | 4/2005 | Mora et al. | | |
| 7,000,121 B2* | 2/2006 | Jarosz | ............. | H04L 43/10 713/151 |
| 7,120,122 B1* | 10/2006 | Starr | ............. | H04L 12/2602 370/250 |
| 7,162,666 B2 | 1/2007 | Bono | | |
| 7,203,748 B2* | 4/2007 | Hare | ............. | H04L 69/40 709/208 |
| 7,275,100 B2* | 9/2007 | Yamagami | ............. | H04L 29/06 709/213 |
| 7,284,147 B2* | 10/2007 | Rao | ............. | G06F 11/0709 709/223 |
| 7,302,615 B2* | 11/2007 | Sakai | ............. | G06F 11/0727 370/222 |
| 7,330,444 B1* | 2/2008 | Pasqua | ............. | H04L 67/1097 370/282 |
| 7,337,373 B2* | 2/2008 | O'Brien | ............. | G06F 11/0709 714/55 |
| 7,355,981 B2* | 4/2008 | Jorgenson | ............. | H04L 41/142 370/241 |
| 7,409,577 B2* | 8/2008 | Wing | ............. | G06F 11/2025 703/21 |
| 7,580,999 B1* | 8/2009 | Mann | ............. | H04L 41/0213 709/223 |
| 7,590,898 B2* | 9/2009 | Coekaerts | ............. | G06F 11/0709 709/223 |
| 7,761,562 B1* | 7/2010 | Stewart | ............. | H04L 69/14 709/224 |
| 7,782,866 B1* | 8/2010 | Walsh | ............. | H04L 63/104 370/395.31 |
| 7,813,263 B2 | 10/2010 | Chang et al. | | |
| 7,840,670 B2 | 11/2010 | Hedayat et al. | | |
| 7,856,480 B2 | 12/2010 | Muchow | | |
| 7,917,613 B2* | 3/2011 | Letca | ............. | H04L 43/0817 709/223 |
| 7,954,161 B1* | 5/2011 | Guruswamy | ............. | G06F 21/577 726/22 |
| 7,983,175 B2* | 7/2011 | Gale | ............. | H04L 12/2697 370/242 |
| 8,121,041 B2 | 2/2012 | Sajassi et al. | | |
| 8,135,807 B2 | 3/2012 | Jackson | | |
| 8,156,219 B2 | 4/2012 | Qiu et al. | | |
| 8,199,654 B2* | 6/2012 | Francisco | ............. | H04L 12/2602 370/238 |
| 8,201,016 B2 | 6/2012 | Pattabhiraman | | |
| 8,264,971 B2* | 9/2012 | Alfano | ............. | H04L 41/046 370/242 |
| 8,326,985 B2 | 12/2012 | Luna et al. | | |
| 8,364,802 B1* | 1/2013 | Keagy | ............. | G06F 8/63 709/223 |
| 2003/0012138 A1* | 1/2003 | Abdelilah | ............. | H04L 12/5695 370/231 |
| 2003/0018930 A1* | 1/2003 | Mora | ............. | H04L 67/104 714/42 |
| 2003/0061340 A1* | 3/2003 | Sun | ............. | H04L 12/2602 709/224 |
| 2003/0208537 A1* | 11/2003 | Lane | ............. | G06Q 10/10 709/204 |
| 2005/0021827 A1* | 1/2005 | Matsuura | ............. | H04L 12/2697 709/232 |
| 2005/0180356 A1* | 8/2005 | Gillies | ............. | H04W 40/02 370/329 |
| 2005/0223302 A1* | 10/2005 | Bono | ............. | G06F 11/0724 714/55 |
| 2006/0002292 A1* | 1/2006 | Chang | ............. | H04L 12/462 370/225 |
| 2006/0129695 A1* | 6/2006 | Faibish | ............. | H04L 29/12009 709/245 |
| 2006/0190594 A1* | 8/2006 | Jorgenson | ............. | H04L 12/2697 709/224 |
| 2006/0245369 A1* | 11/2006 | Schimmelpfeng | .. | H04L 43/0817 370/252 |
| 2007/0086350 A1* | 4/2007 | Haberkorn | ............. | H04L 69/16 370/242 |
| 2007/0174661 A1* | 7/2007 | Peddada | ............. | G06F 11/2025 714/4.4 |
| 2007/0253329 A1* | 11/2007 | Rooholamini | ..... | H04Q 3/54558 370/220 |
| 2008/0049745 A1* | 2/2008 | Edwards | ............. | H04M 15/00 370/389 |
| 2008/0080392 A1* | 4/2008 | Walsh | ............. | H04L 29/12113 370/254 |
| 2008/0189573 A1* | 8/2008 | Darrington | ............. | G06F 11/0724 714/11 |
| 2008/0288607 A1* | 11/2008 | Muchow | ............. | G06F 9/44505 709/209 |
| 2009/0006885 A1* | 1/2009 | Pattabhiraman | .... | H04L 41/0654 714/4.1 |
| 2009/0034413 A1* | 2/2009 | Sajassi | ............. | H04L 12/1863 370/228 |
| 2009/0037573 A1* | 2/2009 | Qiu | ............. | H04L 41/0663 709/224 |
| 2009/0073984 A1* | 3/2009 | Jackson | ............. | H04L 41/0803 370/394 |
| 2009/0086645 A1* | 4/2009 | Hedayat | ............. | H04L 12/2697 370/250 |
| 2009/0138751 A1* | 5/2009 | Moore | ............. | G06F 11/0709 714/4.1 |
| 2010/0149996 A1* | 6/2010 | Sun | ............. | H04L 29/12292 370/244 |
| 2010/0223492 A1* | 9/2010 | Farrugia | ............. | H04L 65/1016 714/4.1 |
| 2011/0040860 A1* | 2/2011 | DeCusatis | ............. | H04L 41/0869 709/223 |
| 2011/0040896 A1* | 2/2011 | DeCusatis | ............. | H04J 14/0278 709/249 |
| 2011/0060824 A1* | 3/2011 | Lundstrom | ............. | H04L 43/10 709/224 |
| 2011/0167119 A1* | 7/2011 | Wan | ............. | H04L 43/10 709/206 |
| 2011/0211441 A1* | 9/2011 | Matityahu | ............. | H04L 43/0811 370/217 |
| 2011/0296011 A1* | 12/2011 | Dare | ............. | G06F 9/544 709/224 |
| 2012/0110173 A1* | 5/2012 | Luna | ............. | H04L 69/28 709/224 |
| 2012/0146968 A1* | 6/2012 | Glen | ............. | G09G 5/003 345/204 |
| 2012/0324091 A9* | 12/2012 | Raleigh | ............. | H04L 41/0893 709/224 |
| 2013/0055373 A1* | 2/2013 | Beacham | ............. | H04L 47/12 726/13 |
| 2013/0124607 A1* | 5/2013 | Griffith | ............. | H04L 43/10 709/203 |
| 2013/0124718 A1* | 5/2013 | Griffith | ............. | G06F 11/3006 709/224 |
| 2013/0124752 A1* | 5/2013 | Griffith | ............. | G06F 11/3006 709/235 |
| 2013/0124911 A1* | 5/2013 | Griffith | ............. | H04L 45/026 714/4.2 |
| 2013/0124912 A1* | 5/2013 | Griffith | ............. | G06F 11/20 714/4.2 |

OTHER PUBLICATIONS

U.S. Appl. No. 13/296,419, patent prosecution, Sep. 27, 2013 Notice of Allowance.

U.S. Appl. No. 13/296,419, patent prosecution, Apr. 11, 2013 Non-Final Rejection.

(56) References Cited

OTHER PUBLICATIONS

U.S. Appl. No. 13/296,428, patent prosecution, Dec. 17, 2013 Notice of Allowance.
U.S. Appl. No. 13/296,428, patent prosecution, Sep. 27, 2013 Non-Final Rejection.
U.S. Appl. No. 13/296,388, patent prosecution, Oct. 3, 2013 Non-Final Rejection.
U.S. Appl. No. 13/296,419, patent prosecution—Nov. 26, 2013 Notice of Allowance.
U.S. Appl. No. 13/296,419, patent prosecution—Sep. 27, 2013 Notice of Allowance.
U.S. Appl. No. 13/296,419, patent prosecution—Apr. 11, 2013 Non-Final Rejection.
U.S. Appl. No. 13/296,419, patent prosecution, Feb. 19, 2014, Notice of Allowance.
U.S. Appl. No. 13/296,428, patent prosecution, Feb. 27, 2014 Non-Final Rejection.
Singh et al; DYSWIS: An Architecture for Automated Diagnosis of Networks.
Gillen et al.; Scalable, adaptive time-bounded node failure detection, 10th IEEE High Assurance Systems Engineering Symposium, AN-9879606; 179-186, 2007.
Qiu et al.; Fault Detection, Isolation and Diagnosis in Multihop Wireless Networks, Dec. 2003.
Amazon, Internet Cloud Architect, Oct. 2010.
Chohan et al; AppScale Design and Implementation; UCSB Technical Report No. 2009-02, Jan. 27, 2009.
Ylastic, Amazon Web Services.
Google, What is Google App Engine?—Google App Engine—Google Code.
Hewlett-Packard Development Company, L.P., Technical documentation, 2011.
http://www.linux-ha.org/doc/users-guide/_components.html; Components—Introduction to Heartbeat.
Oracle, Network Protocols—Coherence 3.4 User Guide—Oracle Coherence Knowledge Base, http://coherence.oracle.com/display/COH34UG/Network+Protocols.
Oracle, Messaging Pattern—The Coherence Incubator—Oracle Coherence Knowledge Base, http://coherence.oracle.com/display/INCUBATOR/Messaging+Pattern.
Symantec, Enterprise Support—Symantec Corp.—Veritas Cluster Server 5.0.1 (HP-UX) User's Guide.
VMware, VMware vCenter Server Heartbeat.
VMware, VMware vCenter Server Heartbeat for High Availability, http://www.vmware.com/products/vcenter-server-heartbeat.
JGroups, JGroups—A Toolkit for Reliable Multicast Communication, http://www.jgroups.org/index.html.
Oracle, Oracle Coherence, http://www.oracle.com/technetwork/middleware/coherence/overview/index.html.
Toad World, Survey distributed databases—Toad for Cloud Wiki, http://wiki.toadforcloud.com/index.php/Survey_distributed_databases.
MSN, How to force Kerberos to use TCP instead of UDP in Windows, http://support.microsoft.com/kb/244474.

* cited by examiner

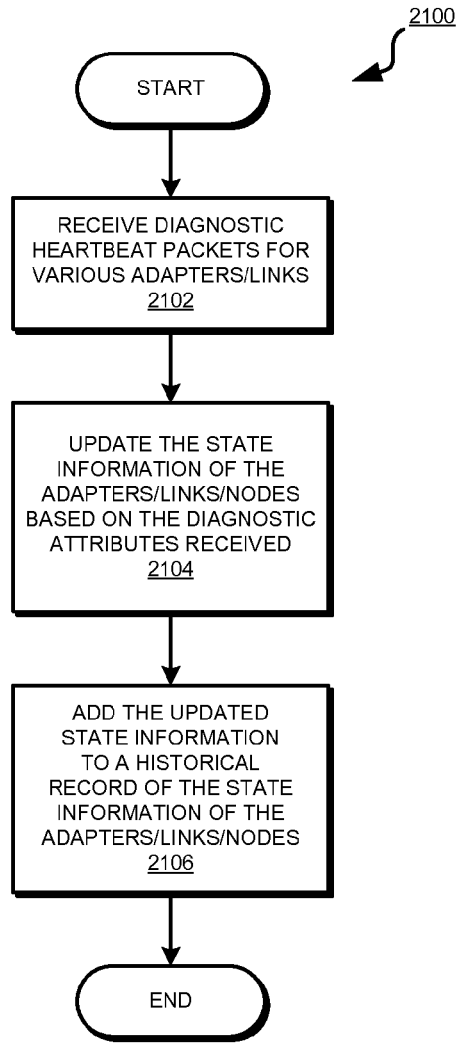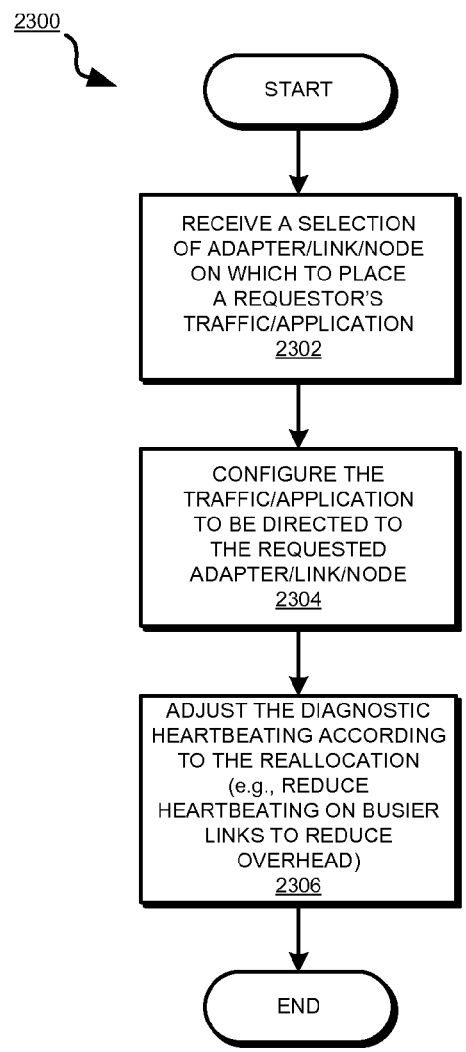

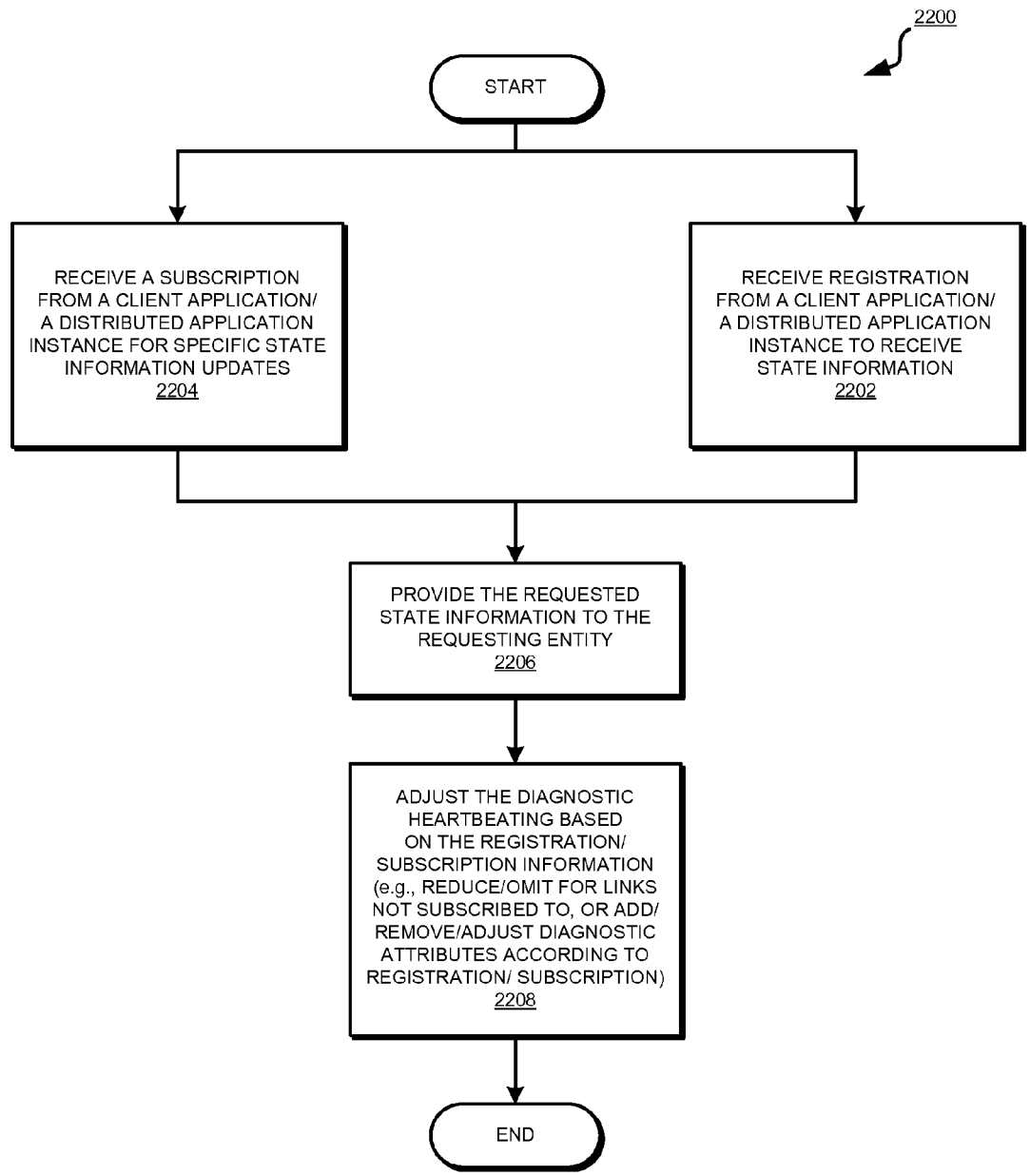

DIAGNOSTIC HEARTBEATING IN A DISTRIBUTED DATA PROCESSING ENVIRONMENT

The present application is a continuation application of, and claims priority to, a U.S. patent application of the same title, Ser. No. 13/296,407, which was filed on Nov. 15, 2011, assigned to the same assignee, and incorporated herein by reference in its entirety.

TECHNICAL FIELD

The present invention relates generally to a method, system, and computer program product for a reliable data communication system. Particularly, the present invention relates to a method, system, and computer program product for diagnostic heartbeating in a distributed data processing environment.

BACKGROUND

A reliable peer-to-peer communication system is a communication system in a distributed data processing environment that provides reliable data communication services. Distributed applications, such as instances of a distributable application executing on different nodes or machines of a data processing environment, utilize these data communication services for providing their functionality. Client systems, such as an application that is a client of a distributed application instance, also inherently depend on these data communication services to accomplish their desired functions with the distributed applications.

For example, reliable data communication services include functions commonly required by distributed applications, such as reliable message delivery to all members of a domain, global in-order delivery of messages or sequences of messages, and synchronization barriers. Such services are used by currently available distributed applications.

A domain is a collection or a set of data processing systems connected by a network, data bus and/or shared memory or storage that participate in a given distributed data processing environment. For example, a data processing environment may include five computers, three of which may host instances of a distributed application. The three computers, also known as hosts or nodes, which host the distributed application instances, form a domain that has to provide the aforementioned reliable data communication services.

A barrier is a type of synchronization method. A barrier for a group of threads or processes is a stopping point where the threads or processes subject to the barrier must stop executing to allow other threads or processes to catch-up or synchronize at the barrier, before the threads or processes can resume executing. Various nodes in a domain, and distributed application instances executing thereon, have to remain synchronized with each other to provide their functions in a consistent manner. In some cases, additional functions, such as multi-phase protocols with global barriers, zoning (creation of sub-domains) and distributed locking may be offered by data communication services in a distributed data processing environment to satisfy the synchronization needs of the distributed applications.

Reliable peer-to-peer communication is a type of distributed data communication service in distributed data processing environment that seeks to provide a threshold level of reliability in message delivery between the peer nodes in the distributed data processing environment. Many distributed applications use reliable peer-to-peer communication to provide a particular level of performance, functionality, stability, or security.

For example, distributed transaction systems require reliable peer-to-peer communication to ensure transaction integrity. As another example, distributed databases and distributed file systems require reliable peer-to-peer communication to ensure data consistency across the various data instances or partitions. Clusters of data processing systems in high availability (HA) data processing environments rely on such peer-to-peer communications to maintain the desired level of system availability, load balancing and system performance. Logistics, telecommunication, and industrial control systems are some examples of types of distributed applications, which require reliable peer-to-peer communication services for ensuring a reliable delivery of their respective functionalities.

SUMMARY

The illustrative embodiments provide a method, system, and computer program product for diagnostic heartbeating in a distributed data processing environment. In at least one embodiment, a method for diagnostic heartbeating in a distributed data processing environment is provided. The method includes a first component, executing using a processor and a memory in a first data processing system, receiving from a second component a set of diagnostic parameters to include in a diagnostic heartbeat packet, wherein the diagnostic heartbeat packet is a packet comprising a header, a set of heartbeat parameters, and the set of diagnostic parameters. The method further includes the first component receiving from the second component information identifying a data communication protocol to be used for transmitting the diagnostic heartbeat packet. The method further includes the first component setting a first diagnostic parameter in the set of diagnostic parameters to a first value, the first value being selected to detect a first soft network error condition. A soft network error condition is a network error condition that adversely affects transmission of packets having certain properties in the data communication network. The method further includes the first component configuring the diagnostic heartbeat packet for transmission using the identified data communication protocol and including the set of diagnostic parameters. The method further includes the first component sending the diagnostic heartbeat packet to the second component.

In at least one embodiment, a computer program product for diagnostic heartbeating in a distributed data processing environment is provided. The computer program product includes one or more computer-readable tangible storage devices. The computer program product further includes program instructions, stored on at least one of the one or more storage devices, to receive from a second component a set of diagnostic parameters to include in a diagnostic heartbeat packet, wherein the diagnostic heartbeat packet is a packet comprising a header, a set of heartbeat parameters, and the set of diagnostic parameters. The computer program product further includes program instructions, stored on at least one of the one or more storage devices, to receive information identifying a data communication protocol to be used for transmitting the diagnostic heartbeat packet. The computer program product further includes program instructions, stored on at least one of the one or more storage devices, to set a first diagnostic parameter in the set of diagnostic parameters to a first value, the first value being selected to detect a first soft network error condition. A soft network error condition is a network error condition that adversely affects transmission of packets having certain properties in the data communication network. The computer program product further includes program instructions, stored on at least one of the one or more storage devices, to configure the diagnostic heartbeat packet for transmission using the identified data communication protocol and including the set of diagnostic parameters. The computer program product further includes program instructions, stored on at least one of the one or more storage devices, to send the diagnostic heartbeat packet.

In at least one embodiment, a computer system for diagnostic heartbeating in a distributed data processing environment is provided. The computer system includes one or more processors, one or more computer-readable memories, and one or more computer-readable tangible storage devices. The computer system further includes program instructions, stored on at least one of the one or more storage devices for execution by at least one of the one or more processors via at least one of the one or more memories, to receive from a second component a set of diagnostic parameters to include in a diagnostic heartbeat packet, wherein the diagnostic heartbeat packet is a packet comprising a header, a set of heartbeat parameters, and the set of diagnostic parameters. The computer system further includes program instructions, stored on at least one of the one or more storage devices for execution by at least one of the one or more processors via at least one of the one or more memories, to receive information identifying a data communication protocol to be used for transmitting the diagnostic heartbeat packet. The computer system further includes program instructions, stored on at least one of the one or more storage devices for execution by at least one of the one or more processors via at least one of the one or more memories, to set a first diagnostic parameter in the set of diagnostic parameters to a first value, the first value being selected to detect a first soft network error condition. A soft network error condition is a network error condition that adversely affects transmission of packets having certain properties in the data communication network. The computer system further includes program instructions, stored on at least one of the one or more storage devices for execution by at least one of the one or more processors via at least one of the one or more memories, to configure the diagnostic heartbeat packet for transmission using the identified data communication protocol and including the set of diagnostic parameters. The computer system further includes program instructions, stored on at least one of the one or more storage devices for execution by at least one of the one or more processors via at least one of the one or more memories, to send the diagnostic heartbeat packet.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of illustrative embodiments when read in conjunction with the accompanying drawings, wherein:

FIG. 21 depicts a flowchart of an example process of historically tracking soft network error conditions in a distributed domain in accordance with an illustrative embodiment;

FIG. 22 depicts a flowchart of an example process of registration or subscription in accordance with an illustrative embodiment;

FIG. 23 depicts a flowchart of an example process of soft network error condition aware data routing in accordance with an illustrative embodiment;

DETAILED DESCRIPTION

Figure 1:
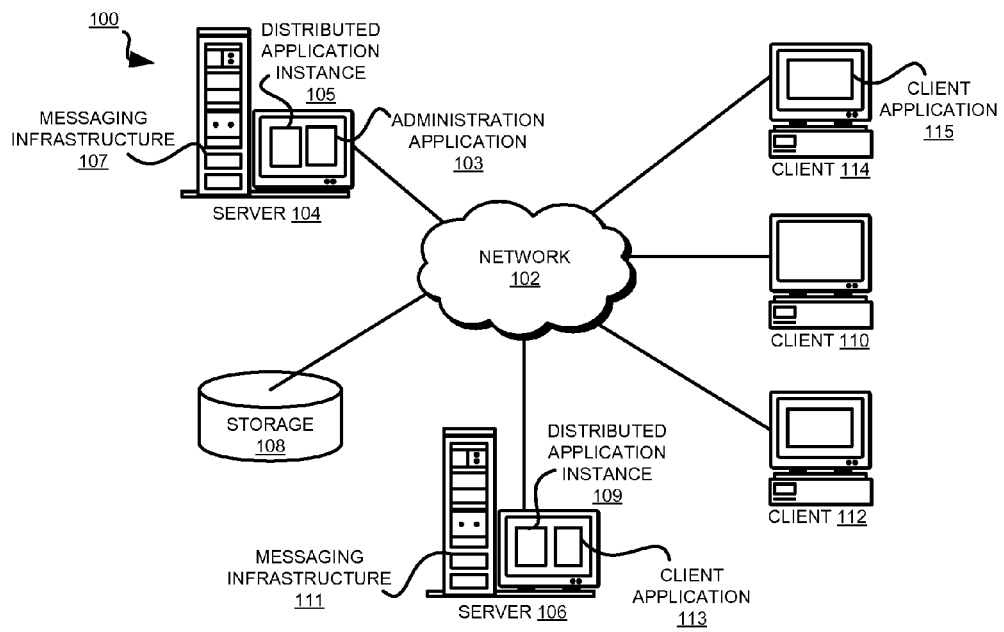
FIG. 1 depicts a pictorial representation of a network of data processing systems in which illustrative embodiments may be implemented.

Many distributed applications include a proprietary built-in reliable communication layer, which provides reliable peer-to-peer communication services to the distributed instances of the application. Other distributed applications use reliable peer-to-peer communication services provided by standalone peer-to-peer communication systems via an application programming interface (API). Examples of the latter are Reliable Scalable Clustering Technology (RSCT) in conjunction with Cluster Aware AIX (CAA) by IBM Corporation; Oracle Coherence by Oracle Corporation; JGroups, which is an open-source product; and Windows Clustering by Microsoft Corporation (each manufacturer may have one or more trademarks and other rights in the United States and other countries in the product-names and marks associated with their respective products).

In presently available cloud computing environments, implementations of distributed databases are abound. Generally, distributed databases in cloud computing environments require a core set of above described functions of a peer-to-peer communication system. Some such distributed databases have a proprietary built-in reliable communication layer whereas others depend on services of a standalone peer-to-peer communication system.

In this disclosure, the proprietary built-in reliable communication layer and the standalone peer-to-peer communication system are collectively referred to as "messaging infrastructure." The messaging infrastructure of an embodiment provides the reliable peer-to-peer communication services to the client applications and distributed applications that communicate with the messaging infrastructure. An embodiment described with respect to a messaging infrastructure can be practiced to improve a proprietary built-in reliable communication layer or a standalone peer-to-peer communication system in the manner described, or a combination thereof.

Within the scope of this disclosure, members of a domain may be a heterogeneous collection of physical or virtual machines of different hardware types, architectures, or running different operating systems. For example, a domain according to an embodiment can include one personal computer using the Linux® operating system, a tablet computer based on the Android™ operating system, and a gaming console operating using a version of the Windows® operating system. Linux is a registered trademark of Linus Torvalds in the United States, other countries, or both. Android is a trademark of Google Inc. in the United States, other countries, or both. Windows is a trademark of Microsoft Corporation in the United States, other countries, or both.

Each node in a given domain may communicate with another node in the domain using one or more network adapters (adapters). Generally, different nodes, or applications executing on the different nodes, can communicate with each other using other mechanisms, such as shared memory or data storage area. In describing an embodiment using an adapter, the embodiment is not limited to only the network adapter means of data communications. The embodiments contemplate applicability of the disclosed concepts to such other means of communication between nodes and applications in a distributed data processing environment. The embodiments are described using adapters only as examples for the clarity of the description and not as a limitation on the embodiments.

A reliable peer-to-peer communication system, such as the messaging infrastructure of an embodiment, maintains membership state information (state information). State information is information about the state of the nodes and network adapters in a given domain. Generally, the state information provides an indication of whether a node, a particular adapter, or a communication link between adapters in different nodes is alive and useable.

The embodiments recognize that the state information may be used in other ways in an implementation of reliable communication services. For example, in a standalone peer-to-peer communication system, the state information can be shared with the distributed applications, client applications, or both to improve their respective performances. Clients often need to be informed about the state of domain members, such as the nodes, and in particular about the connectivity to those members via one or more adapters, so that the clients can perform with a desired level of reliability.

Presently, the state of the members is obtained by sending keep-alive data packets, also known as heartbeats, between adapters of the various nodes. Various algorithms are used for identifying adapter neighborhoods, that is, an identification of adapter(s) to which a particular adapter sends heartbeats, and adapter(s) from which the particular adapter listens for heartbeats. The neighborhood identification process results in a messaging topology. For each adapter, a messaging topology entails an assignment of one or more adapters to which to send heartbeats and another assignment of one or more adapters from which to listen for heartbeats.

Such assignments can be fixed, random, static when defined, or dynamically changeable based on the changes in the domain. As an example, in some implementations of the Gossip protocol, which is a membership protocol with total ordering properties, heartbeat packets, or messages, are sent to a randomly selected set of members. Implementations of AIX CAA, JGroups, and Oracle Coherence use the Gossip protocol for heartbeat messaging to determine the state information.

Functionally, a reliable peer-to-peer communication system includes two components—one that implements membership and another that implements reliable communication services as described above. The membership component provides state information in the form of an intra-domain routing table that is dynamically updated to represent network connectivity as detected by the heartbeating. This routing table is used by the reliable peer-to-peer communication system to route data traffic in the distributed domain. In some implementations, client data traffic can double as a rudimentary heartbeat, which can be utilized for similar purposes by the reliable peer-to-peer communication functionality.

The embodiments recognize that the state information maintained in a presently available peer-to-peer communication system is deficient in several respects. Consequently, presently maintained state information fails to identify and address certain types of problems in the distributed data communication.

For example, the embodiments recognize that for performance reasons, the presently used heartbeat implementation of a membership component sends heartbeats of a predetermined packet size, which is relatively small compared to the packets carrying the data payload of the distributed applications. Furthermore, the embodiments recognize that the heartbeat packets use a fixed pre-determined protocol type. While the small heartbeat packets of a fixed protocol type are sufficient to establish if two adapters are communicating with each other and that the basic switch settings are correct, the ability to receive heartbeats of small size or a specific protocol type is not sufficient as a reliability criterion for a fully functional network connection. The embodiments recognize that the messaging infrastructure, and applications using the messaging infrastructure, typically generate network traffic of a varied pattern, packets of different sizes, and use several protocol types, reliable communication of which cannot be ensured by the presently used heartbeat packets.

The embodiments further recognize that many types of errors in network hardware or configuration are not detected by the presently used heartbeating with small fixed packet size. The embodiments recognize that such undetected errors impair the functionality of the messaging infrastructure, applications dependent thereon, or both.

For example, under certain circumstances, transmission of a small heartbeat packet may succeed where the transmission of larger packets may fail. In such circumstances, a frequently observed failure symptom is that the packets of smaller than a threshold size are processed through the data communication links, but packets of larger than the threshold size are not.

The embodiments recognize many reasons for such an error condition that results in the failure of large packet transmissions. For example, a defective or misconfigured port on a network switch in a link may cause the failure. As another example, mismatched impedance values of cable terminators may cause signal reflection. An effect of signal reflection is that packets of shorter than a threshold size pass through the link but the transmission of larger packets fails. For example, pulse reflection can have the effect that Cyclic Redundancy Check (CRC) errors are observed for larger than the threshold size of packets.

As another example, a mismatch in the maximum packet size configuration of the endpoints of a link, such as an adapter or a port on a switch, can also cause failures in transmitting packets of larger than a threshold size while allowing smaller packets to be successfully transmitted. Incompatible port settings at connection endpoints can have similar results. For example, if one adapter is configured for full duplex communication and the other adapter in the link is not, the likelihood that the transmission of packets above a certain size may fail increases.

The embodiments recognize another type of error condition that escapes detection with the presently used heartbeat packets is that packets containing certain bit patterns may fail transmission whereas other packets that do not include those bit patterns may succeed. Signal degradation on network cables, static or noise in the link, radio interference in the wireless links, frequency roll-off from a cable of wrong type or a cable defect may also cause certain bit patterns to not be transmitted correctly, causing a transmission failure for the packets that contain those bit patterns.

As an example, cable defects or the use of a cable type that is not according to the specification for a given type of data communication link may cause frequency roll-off in Ethernet cables. An effect of frequency roll-off is that packets with certain bit patterns will not be transmitted and that a high rate of CRC errors will be observed.

The embodiments recognize that mechanical damage to the cables, electro-magnetic frequency (EMF) interference from other sources, temperature, and many other similar factors can introduce these and other types of errors. Such other errors similarly escape detection by the presently used heartbeating technique.

As another example of errors that escape detection, remedy, or workaround due to the presently used heartbeating, the embodiments recognize that using the presently available heartbeating, packets of certain types may be transmitted successfully while packets of other types may not. For example, the presently used heartbeating technique is insufficient to detect such errors when caused by switches or firewalls that are configured to only handle packets of a certain type. For example, presently, AIX CAA will not detect a remote adapter to be alive if processing of multicast packets is disabled on a switch in the link. Failure to process certain packet types, as in this example, can have dire results. For example, multiple occurrences of such failures can cause cluster partition. A failure affecting a single adapter may render reliable peer-to-peer communication services non-functional.

The embodiments recognize errors in device drivers as another example of error conditions not detected, remedied, or circumvented by the presently used heartbeating. Errors in device drivers can cause failure in large data size user datagram protocol (UDP) packet processing, such as causing a failure to reassemble data packets or causing processor overload.

Error conditions such as those described above as examples are called soft network errors, or soft network failures. Generally, within the scope of this disclosure, a soft network error is a network error condition that adversely affects the transmission of packets having certain properties in a data communication network. Many other variants of soft network errors will be apparent from this disclosure to those of ordinary skill in the art and the same are contemplated within the scope of the illustrative embodiments. Soft network errors go undetected under the presently used heartbeating schemes, yet have a pervasive effect on the functionality of the reliable peer-to-peer communication system and applications that depend thereon. Soft network errors are expensive and difficult to debug, and require specialized expertise for identification and isolation.

For example, the diagnosis of soft network errors presently requires knowledge of the internals of the reliable peer-to-peer communication system, and of the distributed applications relying thereon, to localize the cause of failure to the networking layer. Subsequently, hardware diagnostics and traces have to be collected to identify the hardware component that caused the error. Debugging requires coordination of several groups that manage various components, such as applications, operating system, storage area networks (SAN) and networking. Detecting, remedying, and circumventing soft network errors are therefore presently tasks that require a variety of skills along with significant loss of system availability.

In distributed systems that employ certain clustering middleware, some common symptoms of soft network errors are "hangs" in the Group Services layer. In the presence of such a hang, client applications such as the cluster manager and the logical volume manager are rendered non-functional. In the presence of a hang of processing in Group Services, the cluster manager hangs and the logical volume manager forces volume groups off-line if no response is received within a specified time-out period.

The illustrative embodiments used to describe the invention generally address and solve the above-described problems and other problems related to soft network errors in reliable peer-to-peer communications in distributed data processing systems. The illustrative embodiments provide a method, system, and computer program product for diagnostic heartbeating in a distributed data processing environment.

Generally, an embodiment of the invention provides an improved method of heartbeating across a peer-to-peer data communication system. An embodiment describes an improved heartbeat packet configuration to detect soft network errors. An improved heartbeat packet, called a diagnostic heartbeat packet, includes features that enable detection, remedying, and circumventing a variety of soft network errors.

Basic heartbeats are heartbeat packets configured to detect a state of a node—whether the node is alive/responsive—with provisions to prevent erroneous declaration of a node as down/non-responsive. A diagnostic heartbeat packet can be used for obtaining qualitative link information for consumption by higher layers, reliable messaging, or clients, to ensure correct functionality beyond the basic alive/dead status of a node.

Typically, a basic heartbeat packet is configured with attribute values for which the likelihood of success of transmission is the largest in a given data processing environment. For this reason, a basic heartbeat packet has a small packet size relative to the data packets in the data traffic of the data processing environment.

The electrical errors resulting in soft network errors, as described earlier, are more likely to affect transmission of packets larger than a certain size. Consider an example to illustrate the undesirable effect of using only diagnostic heartbeats—if a node does not receive any heartbeats from any adapter of a given remote node, the node may declare the remote node as non-responsive. Consequently, clients of the messaging layer might initiate takeover of resources. For example, a database previously executing on the remote node may be brought online at a different resource.

Reliable information about the alive/dead status of a node is important because, for example, if the remote node is still alive but a link to the remote node is unreliable, bringing the database online at another node can lead to data corruption. Such undesirable effects of soft network errors, such as the database partition in the above example, can be prevented by sending basic heartbeats that are most likely to succeed in a data processing environment. Therefore, an embodiment sends basic heartbeats intermixed with diagnostic heartbeats for reliability reasons, such as to get the basic information about whether a remote node is alive, in a reliable manner.

Furthermore, various embodiments describe improvements to messaging infrastructure that utilize the diagnostic capabilities afforded by the use of diagnostic heartbeat packets (diagnostic heartbeating). Various embodiments further describe modifications to distributed application instances to improve the reliability of their data communications in the distributed data processing environment.

Some embodiments describe improvements to client applications that can improve the reliability, performance, or both, of the distributed applications' functionality. Some other embodiments describe modifications to the existing data processing system components, such as modifications to a TCP/IP stack in the kernel space of a data processing system, to enable diagnostic heartbeating.

Some embodiments describe a method of detecting a soft network error using the diagnostic heartbeats. Some other embodiments describe a method of remedying a soft network error, circumventing a soft network error, or a combination thereof.

The illustrative embodiments are described with respect to certain data and data structures only as examples. Such descriptions are not intended to be limiting on the invention. For example, an illustrative embodiment described with respect to a particular data structure of a diagnostic heartbeat can be implemented with additional or different attributes, data payload, and other components within the scope of the illustrative embodiments. As another example, an illustrative embodiment described with respect to a state information record in the form of a table can be implemented using another suitable form of storing the state information in a messaging infrastructure component according to an embodiment.

Furthermore, the illustrative embodiments may be implemented with respect to any type of data, data source, or access to a data source over a data network. Any type of data application or storage device may provide the data, such as data for an application data packet or historical state information data, to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle Corporation and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
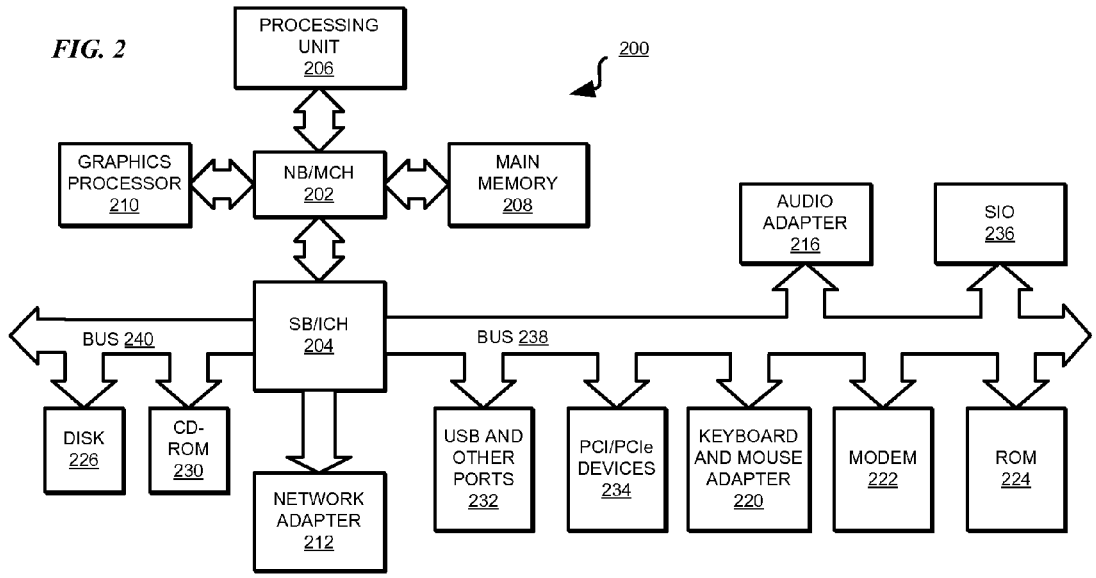
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

As an example, server 104 includes distributed application instance 105 that utilizes reliable peer-to-peer communication services from messaging infrastructure 107. Similarly, server 106 includes distributed application instance 109 that utilizes reliable peer-to-peer communication services from messaging infrastructure 111. Client application 113, which may be a client of distributed application instance 109, user of messaging infrastructure 111's services, or both, may also execute on server 106. Similarly, client 114 includes client application 115, which may be a client of distributed application instance 109, user of messaging infrastructure 111's services, or both. Administration application 103 may be an administration application for administrating distributed application instances 105 and 109. Application 103 is usable with an embodiment as described herein.

In one embodiment, client application 113 connects with messaging infrastructure 111 via inter-process communication, such as pipes, shared memory, semaphores, or sockets. In another embodiment, client 115 connects with messaging infrastructure 107 via network sockets or message passing infrastructures such as Java RMI or CORBA. Generally, a distributed application instance and a distributed messaging infrastructure need not necessarily execute on the same server. For example, distributed application instance 105 and messaging infrastructure 107 may not both execute on server 106, but on different data processing systems. For example, in a virtualized data processing environment, distributed application instance 105 and messaging infrastructure 107 may be on the same frame but in different logical partitions (LPARs) and the communication between distributed application instance 105 and messaging infrastructure 107 occurs via the hypervisor within the scope of the illustrative embodiments. Distributed application instance 105, messaging infrastructure 107, distributed application instance 109, messaging infrastructure 111, client application 115, and client application 113 may implement all or part of an embodiment.

As an example, components of distributed application instance 105, messaging infrastructure 107, distributed application instance 109, messaging infrastructure 111, client application 113, and client application 115 according to an embodiment may each be implemented as program instructions that can be stored on at least one of one or more data storage devices and executed by at least one of one or more processors via at least one of one or more memories.

Servers 104 and 106, storage unit 108, and clients 110, 112, and 114 may couple to network 102 using wired connections, wireless communication protocols, or other suitable data connectivity. For example, a cluster typically has multiple network types, such as IP networks, direct connections of machines via packets exchange implemented by storage protocols (Fibre Channel, SCSI), serial links, and message exchange via writing and reading packets to shared storage such as a hard disk drive. For performance reasons, in sending client traffic, an IP network is given precedence. Furthermore, a given network type may not connect to all nodes in a cluster. For instance, a cluster may span machines located at two geographically distant sites. For the long distance connection, Ethernet may be the preferred connection, and within a geographical location, a direct connection may be preferable. Additionally, within a geographical location, additional non-IP networks, such as Fibre channel or serial connections may be used within the scope of the illustrative embodiments.

Clients 110, 112, and 114 may be, for example, personal computers, network computers, thin clients, or industrial control systems. In the depicted example, server 104 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another, and encompasses components including but not limited to IP and SAN components. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104, server 106, or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may include one or more processors and may be implemented using one or more heterogeneous processor systems. Graphics processor 210 may be coupled to NB/MCH 202 through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204 through bus 238.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs, including messaging infrastructures 107 and 111, distributed application instances 105 and 109, and client applications 113 and 115, are located on one or more storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
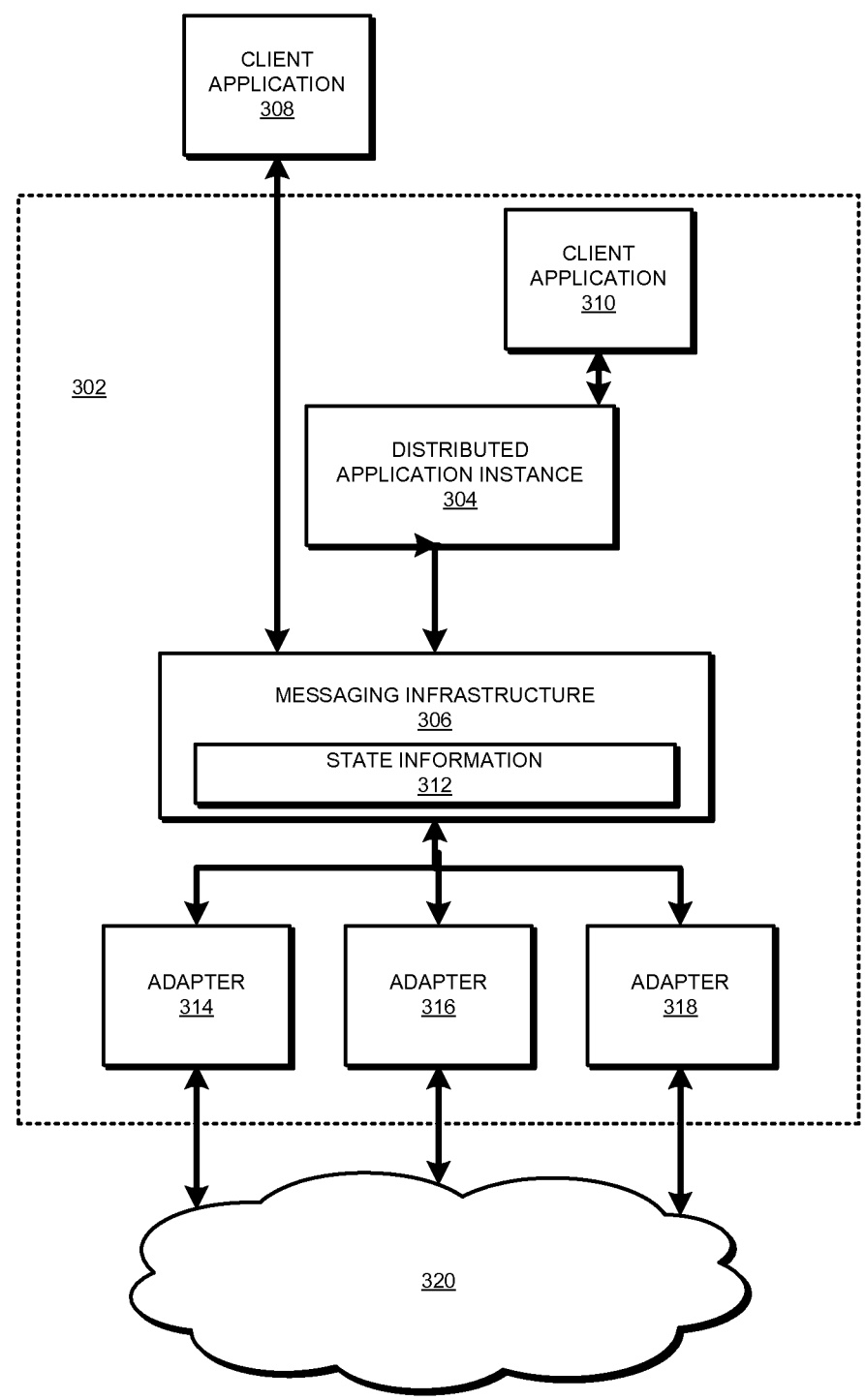
FIG. 3 depicts a block diagram of a generalized reliable peer-to-peer communication configuration in a distributed data processing system with respect to which an illustrative embodiment may be implemented.

With reference to FIG. 3, this figure depicts a block diagram of a generalized reliable peer-to-peer communication configuration in a distributed data processing system with respect to which an illustrative embodiment may be implemented. Data processing system (node) 302 may be a node data processing system, such as server 106 in FIG. 1, in a given distributed data processing environment.

Distributed application instance 304 may be executing in data processing system 302 and using messaging infrastructure 306 for reliable peer-to-peer communication services. As described earlier, messaging infrastructure 306 may be a standalone peer-to-peer communication system in data processing system 302 or a built-in peer-to-peer communication component of distributed application instance 304.

Client application 308 may be an example client application that may utilize the peer-to-peer communication services of messaging infrastructure 306. As an example, client application 308 may be an administration application, such as administration application 103 in FIG. 1, for the various instances of a distributed application of which distributed application instance 304 may be one instance. Client application 310 may be another example client application that may be a client of distributed application instance 304. For example, if distributed application instance 304 were an instance of a distributed database, client application 310 could be a database client application, such as a transactional application that uses distributed application instance 304 for storing transaction data.

Messaging infrastructure 306 maintains state information 312 (membership information, membership state information). State information according to presently used peer-to-peer communication systems may include information indicating whether an adapter, a node, or a link is operational (alive). For example, adapters 314, 316, and 318 may be three network adapters in node 302. Adapters 314, 316, and 318 may be members of the domain whose state or status is stored in state information 312. The depicted configuration is only for the clarity of the description and not a limitation on the embodiments. An embodiment can be implemented in a cluster configuration that includes various combinations of network types. Furthermore, a particular network may not connect all nodes in the cluster. For example, nodes A and B in the cluster might be connected by shared storage or a SAN, and nodes C and D by a different SAN. All four nodes may be interconnected using one or more Internet Protocol (IP) networks, or at least a pair of nodes—one from each pair, such as nodes A and C—connected by a SAN.

Furthermore, an embodiment may be implemented using virtualized data processing systems. For example, all or some nodes belonging to the domain might be logical partitions (e.g., LPARs, Solaris LDom, or a SUN Dynamic System Domain (DSD)). In one embodiment, the virtual nodes of the domain are distributed across multiple frames. In another embodiment the virtual nodes may all reside on the same frame.

Additionally, the I/O devices of LPARs may or may not be virtual. A node belonging to the domain may include some function as Virtual I/O Server (VIOS). Communication between nodes on different frames may be across different types of networking media, such as Ethernet or shared storage. Communication between nodes that reside on the same frame can be virtualized such that the communication path includes Ethernet network and storage devices, but data exchange for such devices in the same frame is implemented using the hypervisor.

Continuing with the depicted example, network 320 may include any number or type of data communication methods, means, and protocols. For example, adapter 314 may be an Ethernet adapter with one IP address to connect to network 320 and adapter 316 may be another Ethernet adapter with a different IP address to connect to network 320. Adapter 318 may be an Internet Small Computer Cystem Interface (iSCSI) adapter usable for connecting to network 320. Alternatively, adapter 318 may be a Universal Serial Bus (USB) adapter connecting the network. Fibre Channel networks based on optical fibre or copper hardware, various serial architectures, for instance Serially Attached SCSI (SAS), Serially Advanced Technology Attachment (SATA), or Infiniband are other network architectures and hardware which network 320 may include.

For example, state information 312 may include an indication corresponding to each of the three example adapters 314, 316, and 318 for node 302 to indicate whether that particular adapter is operational (alive) at a given time. State information 312 may also include an indication of whether node 302 as a whole is available at a given time. For example, node 302 may be deemed available if at least one of adapters 314, 316, or 318 is indicated as alive in state information 312.

In the presently used heartbeating technology, availability information of the members is available but qualitative information of that availability is not available. For example, an adapter may be available, but only packets of a size below a threshold size may be sent or received using that available adapter, a connection there to, a cable connected there to, a switch port in communication therewith, or a combination of other components. Presently, the state information about the members of a domain is not parameterized to reflect conditions that may contribute to soft network errors.

Figure 4:
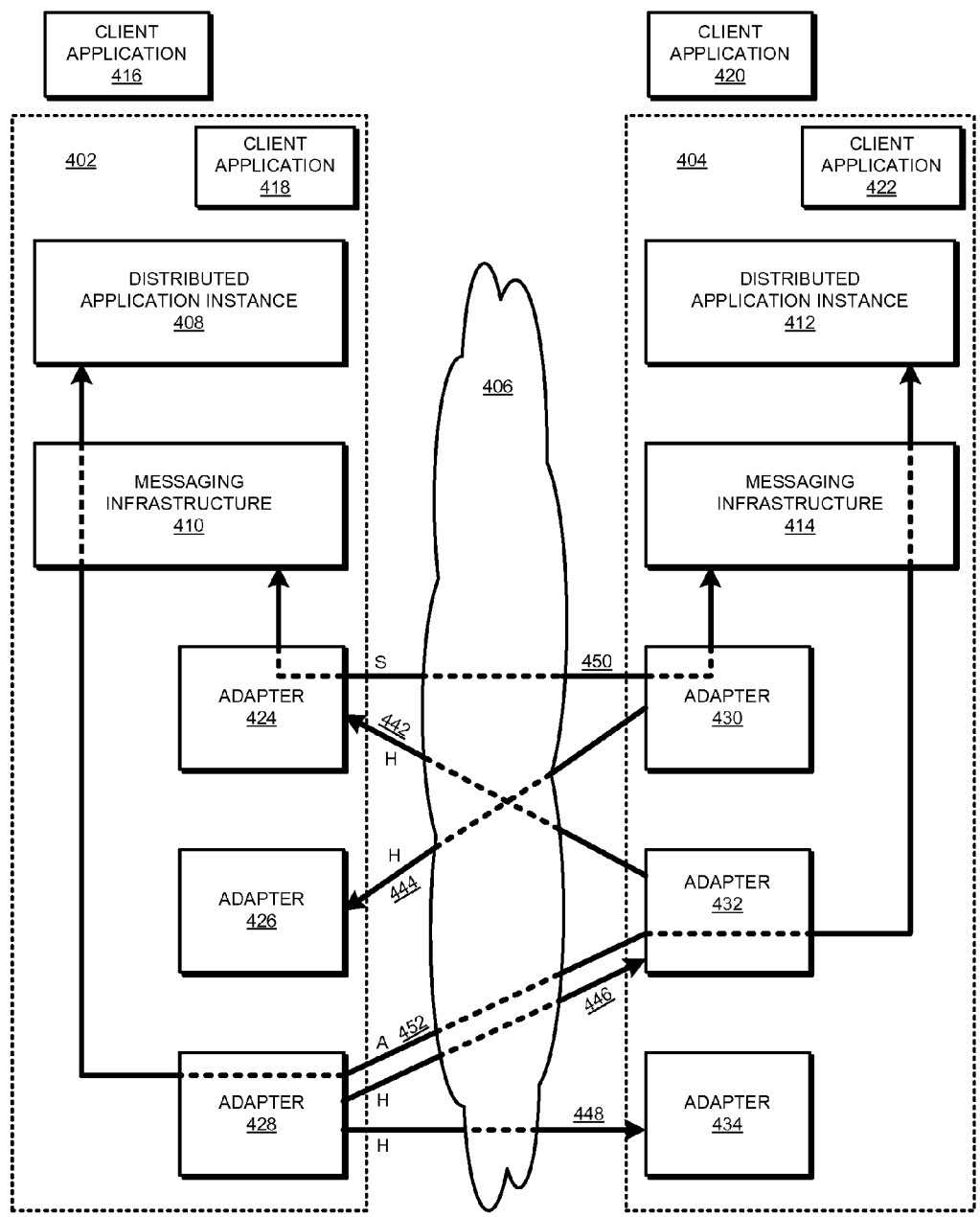
FIG. 4 depicts a block diagram of the various messaging that depends on the membership state information in a reliable peer-to-peer communication system, which can be improved using an illustrative embodiment.

With reference to FIG. 4, this figure depicts a block diagram of the various messaging that depends on the membership state information in a reliable peer-to-peer communication system, which can be improved using an illustrative embodiment. Node 402 may be a node configured in a manner similar to node 302 in FIG. 3.

Node 402 communicates with node 404 using network 406 to form a domain. Node 404 may also be a node configured in a manner similar to node 302 in FIG. 3, but not necessarily identically as node 402. Node 402 hosts distributed application instance 408 and node 404 hosts distributed application instance 412. Distributed application instances 408 and 412 are analogous to distributed application instance 304 in FIG. 3.

Messaging infrastructure 410 in node 402 is analogous to messaging infrastructure 306 in FIG. 3. Messaging infrastructure 414 in node 404 is also analogous to messaging infrastructure 306 in FIG. 3. Client applications 416 and 418 use peer-to-peer communication services of messaging infrastructure 410 as described with respect to client applications 308 and 310 in FIG. 3. Client applications 420 and 422 use peer-to-peer communication services of messaging infrastructure 414 in a similar manner. Any combination of client application instances may comprise a distributed domain, the distributed domain including those nodes, whether physical or virtual, and the adapters therein, on which participating messaging infrastructures 410 and 414 provide their services. For example, in one embodiment, a domain may include client applications 416 and 420. In another embodiment, a domain may include client applications 416, 420, and 422. In another embodiment, the domain may include client applications 416, 418, 420, and 422.

Adapters 424, 426, and 428 may be adapters in node 402 whose state information is maintained in a messaging infrastructure instance, as described with respect to adapters 314, 316, and 318 in FIG. 3. Adapters 430, 432, and 434 may be adapters in node 404 whose state information is similarly maintained in a messaging infrastructure instance. Each instance of messaging infrastructures 410 and 414 maintain state information for all adapters of the domain. For example, messaging infrastructures 410 and 414 each include state information of adapters 424, 426, 428, 430, 432, and 434.

Messages 442, 444, 446, and 448, all labeled "H", are example heartbeat messages (heartbeat packets, or heartbeats) being transmitted between adapters. For example, adapter 432 sends and adapter 424 receives heartbeat 442. Similarly, adapter 430 sends and adapter 426 receives heartbeat 444; adapter 428 sends and adapter 432 receives heartbeat 446; and adapter 428 sends and adapter 434 receives heartbeat 448. Many other adapter pairs or neighborhoods may similarly be configured for exchanging heartbeats, but are not depicted in this figure for the clarity of the illustration. Heartbeats may also be multicast. For example, adapter 432 may send a heartbeat that is received by adapters 424 and 426 (not shown).

Message 450 labeled "S" is an example synchronization message. As described previously, messaging infrastructure 410 and messaging infrastructure 414 exchange message 450 to manage synchronization barriers. Additional synchronization messages may be transmitted in the depicted domain but are not shown in the figure for the clarity of the illustration. In the depicted example, message 450 is communicated using adapters 424 and 430, perhaps because the state information in messaging infrastructures 410 and 414 indicates that adapters 424 and 430 are available for communication.

Message 452 labeled "A" is an example message or packet that carries data payload for distributed application instances 408 and 412. In the depicted example, message 452 is communicated using adapters 428 and 432, perhaps because the state information in messaging infrastructures 410 and 414 indicates that adapters 428 and 432 are available for communication.

Message 452 may be of a size different from the size of any of heartbeat messages 442, 444, 446, and 448. As an example, it is not uncommon for the size of message 452 to exceed the size of message 442. Assume that one or both of adapters 428 and 432 include a reason for a soft network error condition. As the embodiments recognize, the state information presently utilized for selecting a path for transmitting message 452 will allow selecting the link established between adapters 428 and 432 for transmitting message 452, and will not be able to avoid a transmission failure of message 452 under these circumstances. An adapter is selected in the above example without implying a limitation on the illustrative embodiments. Any component of a network, such as a cable, a connector, or a port, can similarly contribute a soft network error condition.

Figure 5:
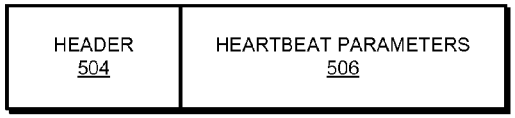
FIG. 5 depicts a block diagram of conceptual distinctions between a basic heartbeat and a diagnostic heartbeat in accordance with an illustrative embodiment.

With reference to FIG. 5, this figure depicts a block diagram of conceptual distinctions between a basic heartbeat and a diagnostic heartbeat in accordance with an illustrative embodiment. Basic heartbeat packet 502 may be useable as message 442, 444, 446, or 448 in FIG. 4.

Basic heartbeat packet 502 includes header 504 and heartbeat parameters 506. For example, header 504 may include a source IP address and port, a destination IP address and port, a timestamp by the sender, a checksum, and other commonly used basic heartbeat header information. Heartbeat parameters 506 may include for example, a heartbeat timeout period, packet size of basic heartbeat packet 502, and other commonly used basic heartbeat parameters. Some protocols, such as Ethernet and Fibre Channel, include a footer segment (not shown) in packets such as basic heartbeat packet 502. A footer segment is not depicted in the various heartbeat packets of FIG. 5 only for simplification of the depiction and not as a limitation on the protocols to which an embodiment applies. An implementation of an embodiment for a particular protocol can easily include a footer segment within the scope of the illustrative embodiments.

Diagnostic heartbeat packet 508 constructed according to an embodiment improves basic heartbeat packet 502. In one embodiment, diagnostic heartbeat packet 508 may include all the information found in basic heartbeat 502 and additional information. For example, in such an embodiment, header 510 would be similar in structure to header 504 and heartbeat parameters 512 would be similar in structure to heartbeat parameters 506. However, header 510, heartbeat parameters 512, or both, may have different values from header 504, heartbeat parameters 506, or both, to distinguish packet 508 as a diagnostic heartbeat packet as opposed to a basic heartbeat packet. In another embodiment, header 510, heartbeat parameters 512, or both, may also be structurally different from header 504, heartbeat parameters 506, or both, respectively.

In either of the above embodiments of diagnostic heartbeat packet 508, diagnostic heartbeat packet 508 further includes diagnostic attributes 514. In an embodiment, diagnostic heartbeat packet 508 further includes data 516.

Diagnostic attributes 514 include attributes that can be populated with information usable for qualitative measurements, which can be added to a member's state information. For example, one diagnostic attribute 514 may be used to specify a packet size that is different, perhaps larger, than the size of basic heartbeat packet 502.

In one embodiment, data 516 may be used to pad bits to diagnostic heartbeat packet 508 to make the size of diagnostic heartbeat packet 508 correspond to the packet size attribute in diagnostic attributes 514. In another embodiment, an adapter that receives diagnostic heartbeat packet 508 with a value stored in a packet size attribute in diagnostic attributes 514 may automatically inflate diagnostic heartbeat packet 508's size to match that value, or regard diagnostic heartbeat packet 508 as being of that specified packet size value. Using such example diagnostic attribute 514, diagnostic heartbeat packet 508 is usable for testing soft network errors that manifest themselves when the packet size, such as the size of message 452 in FIG. 4, exceeds a particular threshold size.

Another example diagnostic attribute 514 may be a protocol type being used for transmitting diagnostic heartbeat packet 508. Using such example diagnostic attribute 514, diagnostic heartbeat packet 508 is usable for testing soft network errors that manifest themselves when a particular protocol is used.

Another example diagnostic attribute 514 may be used to place a specific bit pattern in diagnostic heartbeat packet 508. Using such example diagnostic attribute 514, diagnostic heartbeat packet 508 is usable for testing soft network errors that manifest themselves when a particular bit pattern appears in the packet being transmitted. In one embodiment, the bit pattern itself may be placed in the data 516 portion of diagnostic heartbeat packet 508. A diagnostic attribute in diagnostic attributes 514 may indicate that diagnostic heartbeat packet 508 contains a bit pattern in the payload, i.e., in the data 516 portion of diagnostic heartbeat packet 508.

These diagnostic attributes 514 and their manner of use are described only as examples for describing the operation of diagnostic heartbeat packet 508 in an easy to understand manner. Generally, a diagnostic attribute be configured to represent Boolean values, a range of alphanumeric values, or a data structure of other diagnostic attributes. Those of ordinary skill in the art will be able to conceive from this disclosure many other diagnostic attributes 514, contents of data 516, contents of header 510, contents of heartbeat parameters 512, or a combination thereof, to diagnose many other types of soft network errors. Such other conceptions are contemplated within the scope of the illustrative embodiments.

Using a combination of diagnostic attributes 514, data 516, header 510, and heartbeat parameters 512 in the described manner, diagnostic heartbeat packet 508 can be transmitted in a distributed domain to detect soft network errors, determine the conditions under which certain soft network errors occur, and identify possible solutions to at least some of those soft network errors. For example, Ethernet frames are either 1518 bytes (1500 payload bytes), or in the case of jumbo frames typically 9 KB (not standardized). A failure to transmit a packet smaller than 1518 bytes indicates a hardware error, a failure to transmit a packet larger than 1518 bytes is likely a soft network error in fragment handling for normal size frames or a hardware error for jumbo frames. The condition that causes such an example soft network error may be detected as a configuration of a receiving adapter. A possible solution that may be identified through this exercise may be to reconfigure the receiving adapter or cause the sending adapter to re-packetize data into smaller packets if transmitting on the link with that receiving adapter.

As another example, Fibre Channel Frames can carry up to 2112 bytes of payload, and an Infiniband frame up to 4 KB. A failure to transmit a large frame might indicate mechanical damage to cables, signal degradation due to temperature, cable length or imperfect connectors if optical fibre is the transport medium. A failure to transmit a large frame might be an effect of signal degradation or frequency roll-off if the transport medium is copper.

Diagnostic heartbeat packet 508 is described in a simplified manner to illustrate how a given heartbeat packet's structure can be modified to form diagnostic heartbeat packet 508. Neither basic heartbeat packet 502, nor diagnostic heartbeat packet 508 is limited to exactly the depiction in FIG. 5. Those of ordinary skill in the art will be able to identify many other possible structures of a basic heartbeat packet that is usable as basic heartbeat 502 within the scope of the illustrative embodiments. Those of ordinary skill in the art will be able to further recognize from this disclosure the various structures possible for diagnostic heartbeat packet 508 for such variations of basic heartbeat packet 502, and such structures of diagnostic heartbeat packet 508 are contemplated within the scope of the illustrative embodiments.

Figure 6:
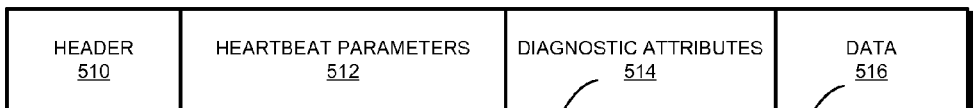
FIG. 6 depicts a block diagram of an improved messaging infrastructure for reliable peer-to-peer communication services in accordance with an illustrative embodiment.

With reference to FIG. 6, this figure depicts a block diagram of an improved messaging infrastructure for reliable peer-to-peer communication services in accordance with an illustrative embodiment. Messaging infrastructure 602 may be messaging infrastructure 410 in FIG. 4 as improved by an embodiment described herein.

Messaging infrastructure 602 includes state information 604. State information 604 may include membership state information as available in presently used messaging infrastructures, such as adapter state (e.g., available or unavailable), node status (e.g., active or inactive), and intra-domain routing information (e.g., available routing paths from one adapter in one node to another adapter in another node).

Further, in accordance with an illustrative embodiment, state information 604 includes diagnostic information 606, such as link performance information and information about known issues related thereto (e.g., soft network errors). Diagnostic attributes 608 may be values of diagnostic attributes derived from diagnostic heartbeat packets received at an adapter, whose state the messaging infrastructure 602 tracks.

In one embodiment, information 606 includes the values of diagnostic attributes 608 or transformations thereof. For example, a diagnostic heartbeat packet may include an adapter identifier, such as a machine address, that is associated with a soft network error. The machine address may be converted or transformed to a corresponding IP address and a port and stored in information 606.

In another embodiment, information 606 may be derivative information derived from diagnostic attributes 608. For example, information 606 may include a throughput performance metric of a link between two adapters (e.g., a value for throughput with regards to a given set of attributes). The throughput metric of the link may be derived from a packet size limitation on that link that has to be used to work around a large packet transmission error detected on that link by using the diagnostic heartbeat packets.

Historical state information 610 may be any repository or data storage suitable for storing state information 604, including information 606 and diagnostic attributes 608, collected through diagnostic heartbeating in a given domain over a period of time. Historical information 610 is useable for detecting a trend in the performance of various member components, predicting certain soft network errors, isolating the cause of certain soft network errors, debugging soft network errors, improving the performance of peer-to-peer communication system, matching a quality of service requirement from a distributed application instance or client application to adapters and links, and many other such diagnostic and performance purposes.

Figure 7:
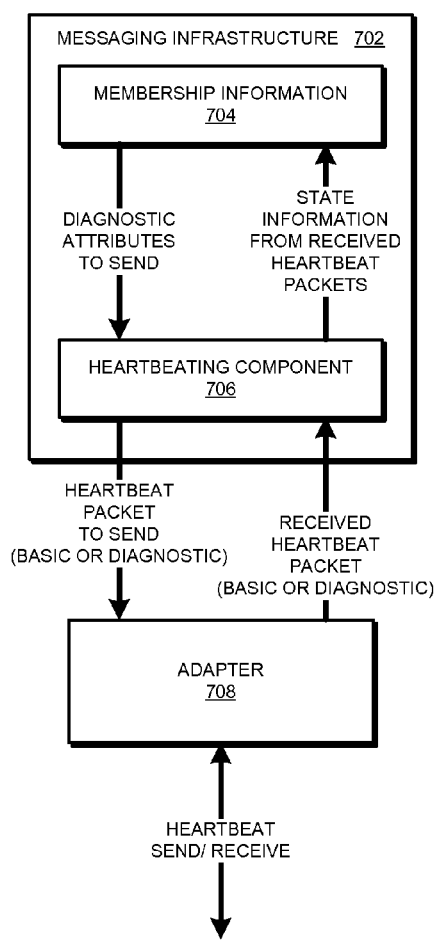
FIG. 7 depicts a block diagram of an improved messaging infrastructure in accordance with an illustrative embodiment.

With reference to FIG. 7, this figure depicts a block diagram of an improved messaging infrastructure in accordance with an illustrative embodiment. Messaging infrastructure 702 is usable as messaging infrastructure 602 in FIG. 6, and includes the features of messaging infrastructure 602 depicted in FIG. 6. For example, membership information 704 of messaging infrastructure 702 may include state information 604 of messaging infrastructure 602 in FIG. 6.

Heartbeating component 706 is a component of messaging infrastructure 702 that, as one of the functions, determines the type of heartbeat packet to send from a particular member adapter. As another function, heartbeating component 706 extracts the diagnostic information from received diagnostic heartbeat packets to populate membership information 704, e.g., to populate the state information in membership information 704.

For determining a type of heartbeat packet to send from an adapter, heartbeating component 706 may use information stored in membership information 704. For example, membership information 704 may additionally store data communication performance requirements of distributed application instances, client applications, or both. As an example, a distributed application instance may specify in membership information 704 that the distributed application instance uses a packet size of 4 KB. As another example, a client application may specify that UDP must be a supported protocol on a link used for the client application's data communications.

Using these and other similarly purposed information from membership information 704, heartbeating component 706 specifies the diagnostic attributes to use in a diagnostic heartbeat packet, the values of at least some of those diagnostic attributes, a data size or pattern in the payload of the diagnostic heartbeat packet, or a combination thereof.

Heartbeating component 706 communicates with another component for creation of the heartbeat packets. Some embodiments of such other component are described with respect to FIG. 8. Once a diagnostic heartbeat packet has been constructed to include the required diagnostic attributes and data, adapter 708 sends that diagnostic heartbeat packet to another adapter in adapter 708's heartbeat neighborhood topology. When adapter 708 receives a diagnostic heartbeat packet, adapter 708 passes the diagnostic heartbeat packet or parts thereof to heartbeating component 706, which parses the diagnostic heartbeat packet or parts thereof for populating the member state information in membership information 704.

Figure 8:
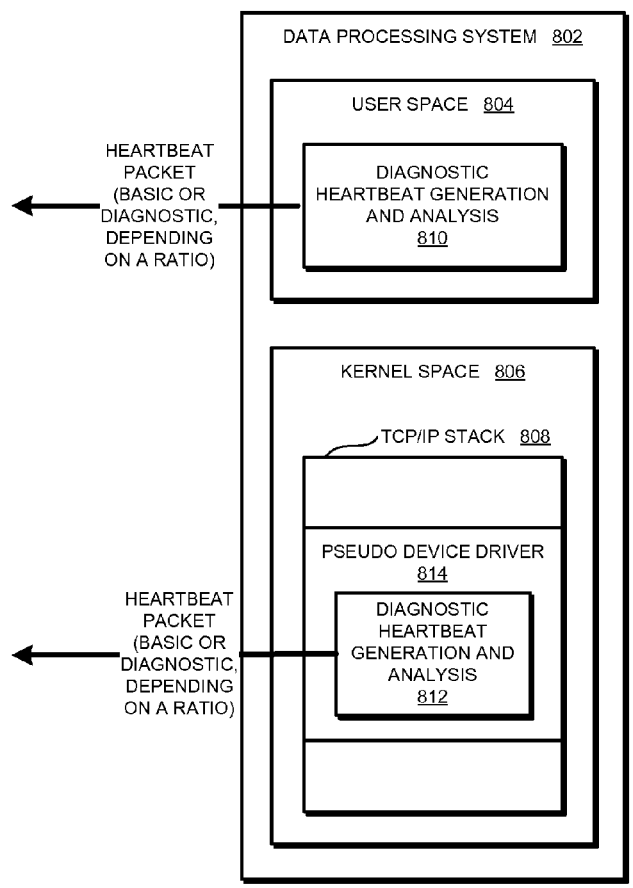
FIG. 8 depicts a block diagram depicting several alternatives for creating and distributing diagnostic heartbeat packets in accordance with an illustrative embodiment.

With reference to FIG. 8, this figure depicts a block diagram depicting several alternatives for creating and distributing diagnostic heartbeat packets in accordance with an illustrative embodiment. A diagnostic heartbeat packet constructed using one of these alternatives is usable for sending to an adapter, such as from heartbeating component 706 to adapter 708 in FIG. 7.

Data processing system 802 may be a node in a distributed domain, such as node 402 in FIG. 4 or a node (not shown) that includes messaging infrastructure 702 in FIG. 7. Data processing system 802 includes user space 804 that is used by applications executing on data processing system 802 for reading and writing their application data. Data processing system 802 also includes kernel space 806. Kernel space 806 is used by the operating system of data processing system 802 for running kernel processes, including TCP/IP stack 808. In one embodiment, diagnostic heartbeat generation and analysis component 810 may execute in user space 804. For example, a daemon running in user space 804 to support reliable peer-to-peer communication services may be modified to include component 810. Alternatively, a new daemon can be added to provide the functionality of component 810.

Component 810 receives the diagnostic attributes to be used in a diagnostic heartbeat packet. Component 810 may further receive desired values of those diagnostic attributes. Component 810 may also receive data, such as specific bit patterns or size of data to include in a diagnostic heartbeat packet. Component 810 may receive such information from a heartbeating component of a messaging infrastructure, such as heartbeating component 706 in FIG. 7. Component 810 creates a diagnostic heartbeat packet based on the received information.

In another embodiment, diagnostic heartbeat generation and analysis component 812 may execute in kernel space 806. For example, pseudo device driver 814 (or other one or more device drivers) relative to TCP/IP or network device driver stack 808 may be modified to include component 812. Alternatively, a new device driver can be added to kernel space 806 to provide the functionality of component 812. Component 812 operates in a manner similar to component 810, and receives and delivers similar information.

In one embodiment, the functionality of component 810 or 812 can be distributed between user space 804 and kernel space 806. For example, component 812's diagnostic heartbeat generation functionality may execute in kernel space 806 and the diagnostic heartbeat analysis functionality may execute in user space 804, or vice versa. Of course the functionality of component 810 or 812 can be distributed in other ways as may be suitable in a given implementation within the scope of the illustrative embodiments.

In an embodiment, component 810 or 812 can send a mix of diagnostic heartbeat packets and basic heartbeat packets to a heartbeating component, such as to heartbeating component 706 in FIG. 7. Furthermore, component 810 or 812 can determine a ratio of a number of basic heartbeat packets and a number of diagnostic heartbeat packets to send within a given time period. Based on the ratio, component 810 or 812 can determine when to send a diagnostic heartbeat packet and when to send a basic heartbeat packet. For example, in one embodiment, when the diagnostic heartbeat packets and the basic heartbeat packets are to be sent in equal numbers, component 810 or 812 sends a diagnostic heartbeat packet and a basic heartbeat packet alternately. As another example, in another embodiment, when twice as many diagnostic heartbeat packets are to be sent as the number of basic heartbeat packets, component 810 or 812 sends a pattern of two diagnostic heartbeat packets followed by one basic heartbeat packet in a given period.

Figure 9:
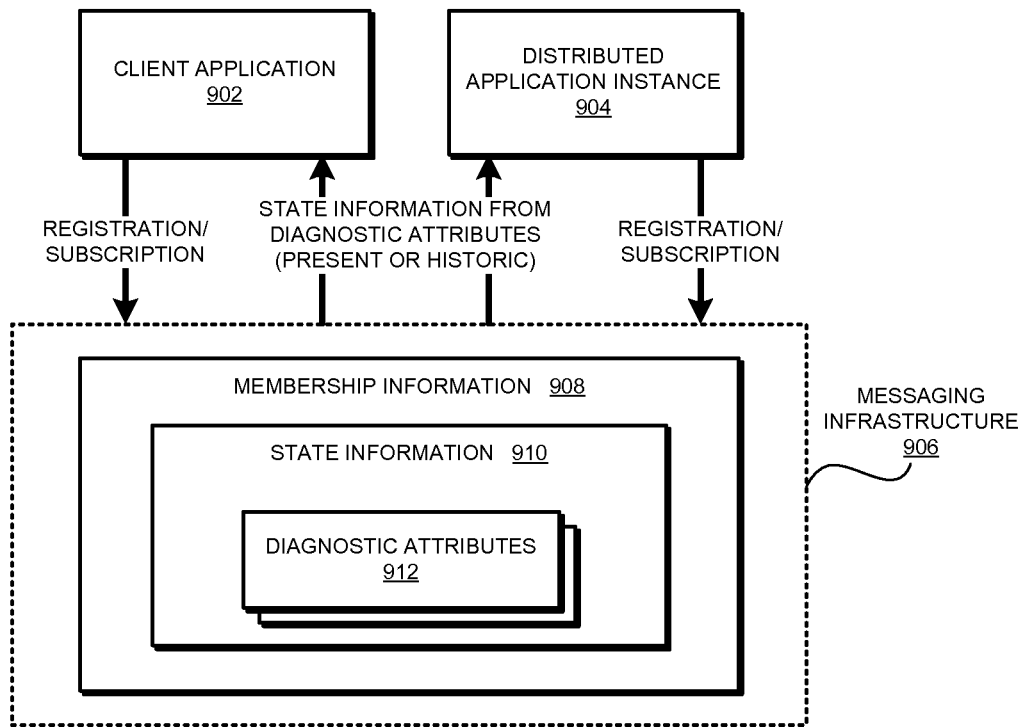
FIG. 9 depicts a block diagram of a registration process for distributing diagnostic information and member state information in a domain in accordance with an illustrative embodiment.

With reference to FIG. 9, this figure depicts a block diagram of a registration process for distributing diagnostic information and member state information in a domain in accordance with an illustrative embodiment. Client application 902 may be similar to any of client applications 416, 418, 420, or 422 in FIG. 4. Distributed application instance 904 may be analogous to any of distributed application instances 408 or 412 in FIG. 4. Messaging infrastructure 906 may be an embodiment of messaging infrastructure 702 in FIG. 7. Membership information 908 is similar to membership information 704 in FIG. 7 and includes state information 910 as described earlier with respect to FIG. 6. State information includes diagnostic attributes 912 or information derived there from as previously described with respect to other embodiments.

Client application 902 registers with messaging infrastructure 906 to receive state information 910. For example, client application 902 may register to receive the current status, performance metrics, and known soft error conditions across the domain, as obtained from diagnostic attributes of diagnostic heartbeat packets.

Client application 902 may alternatively subscribe to messaging infrastructure 906 to receive specific state information about members, state information about specific members, or a combination thereof. For example, client application 902 may subscribe to messaging infrastructure 906 to receive the current status, performance metrics, and known soft error conditions of only those links that can process UDP packets of size greater than 4 KB, as obtained from diagnostic attributes of diagnostic heartbeat packets.

In response to the registration or subscription, messaging infrastructure 906 sends client application 902 the information that client application 902 requested. Information sent to client application 902 in response to the registration or subscription may be only the current state information based on recently received diagnostic attributes, the historic state information, or a combination thereof.

Additionally, (not shown), client application 902 may, through the registration or subscription process, provide messaging infrastructure 906 client application 902's quality of service (QoS) requirement. For example, client application 902 may specify in a registration (or subscription) that client application 902 uses UDP packets, which include a signature (bit pattern), the packets being of sizes 4 KB to 6 KB, or some combination thereof. As another example, client application 902 may specify in a registration (or subscription) that the data traffic of client application 902 should only be placed on a link that has not experienced a soft network error related to packet size limitation in the past thirty days. Of course, when a reason for a soft network error on a link has been remedied, such as when a faulty network cable has been replaced, the history of soft network errors on that link can be edited or reset so that the link is available sooner in response to such QoS specification.

Such QoS specification, performance demand, service restrictions, and other similarly purposed information in the registration (or subscription) process enables messaging infrastructure 906 to efficiently match data traffic to a link in the domain. For example, messaging infrastructure 906 may be able to use such information to preemptively transfer client application 902's data traffic from one link to another when a previously used link experiences a soft network error and fails to meet client application 902's specified requirements.

As another example, messaging infrastructure 906 may use such information to allocate client application 902's data traffic to an adapter that meets client application 902's requirements, the adapter not necessarily being the best performing adapter available. Thus, such information is useful in optimally utilizing the available member resources without over-burdening the resources with better than a threshold performance and under-utilizing resources with less than the threshold level of performance.

Distributed application instance 904 registers or subscribes in a manner similar to that described with respect to client application 902. Distributed application instance 904 provides QoS specification, performance demand, service restrictions, and other similarly purposed information in the registration (or subscription) to messaging infrastructure 906 in a similar manner as client application 902. Messaging infrastructure 906 processes and uses such information from distributed application instance 904 in a manner similar to the above description with respect to client application 902.

Figure 10:
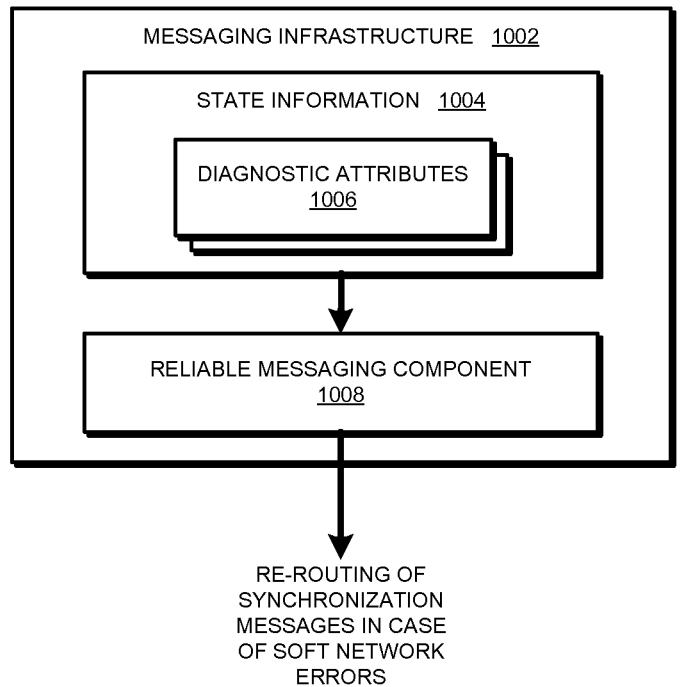
FIG. 10 depicts a block diagram of an improved messaging infrastructure for reliable peer-to-peer communication in accordance with an illustrative embodiment.

With respect to FIG. 10, this figure depicts a block diagram of an improved messaging infrastructure for reliable peer-to-peer communication in accordance with an illustrative embodiment. Messaging infrastructure 1002 includes certain improvements over messaging infrastructure 906 in FIG. 9 as described herein, and is usable as messaging infrastructure 906 in FIG. 9. State information 1004 including diagnostic attributes 1006 is similar to state information 910 including diagnostic attributes 912 in FIG. 9.

Reliable messaging component 1008 is a component to ensure that domain synchronization is accomplished with a higher priority and transparency over application data communication. Particularly, component 1008 ensures that in the event of a hardware failure in a domain member component or a soft network error, synchronization messages are passed to the member nodes in the domain without additional impediment or delay.

As described herein, soft network errors can be detected using diagnostic heartbeat packets in combination with basic heartbeat packets. Diagnostic attributes 1006 reveal the soft network error conditions to component 1008. Component 1008 utilizes this information about the soft network errors and re-routes the synchronization messages over other healthy adapters or links. Such re-routing can be automatic, proactive, responsive to additional policies or conditions, or a combination thereof.

Figure 11:
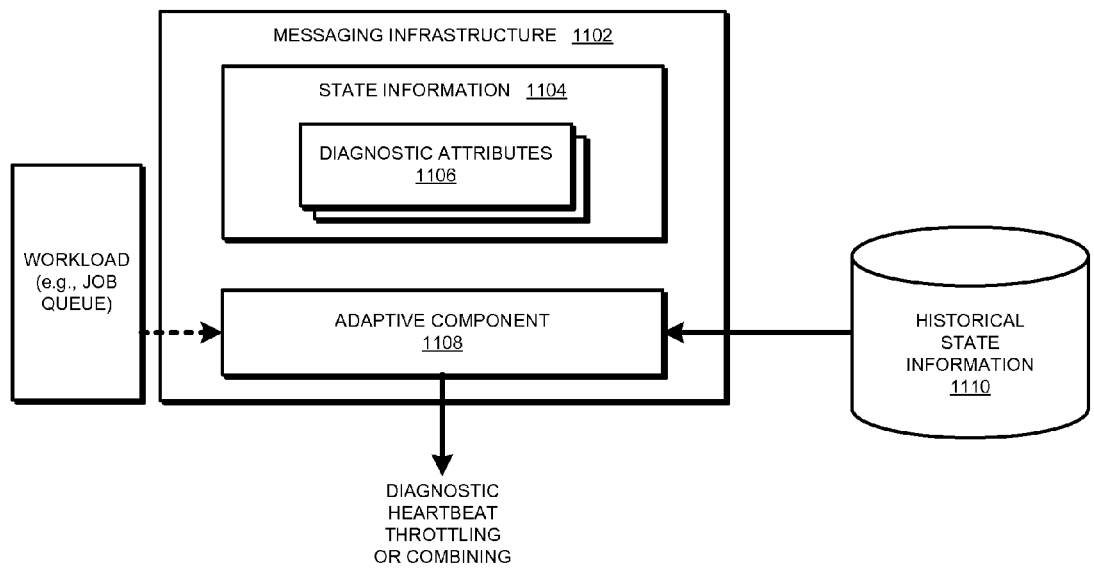
FIG. 11 depicts a block diagram of another improved messaging infrastructure for reliable peer-to-peer communication in accordance with an illustrative embodiment.

With reference to FIG. 11, this figure depicts a block diagram of another improved messaging infrastructure for reliable peer-to-peer communication in accordance with an illustrative embodiment. Messaging infrastructure 1102 includes certain improvements over messaging infrastructure 1002 in FIG. 10 as described herein, and is usable as messaging infrastructure 1002 in FIG. 10. State information 1104 including diagnostic attributes 1106 is similar to state information 1004 including diagnostic attributes 1006 in FIG. 10.

Adaptive component 1108 is a component that ensures that diagnostic heartbeat packets do not cause congestion in the network or performance degradation of the distributed peer-to-peer communication services. To ensure that the peer-to-peer communication services perform at or above a specified service level, adaptive component 1108 can throttle the frequency of diagnostic heartbeat packets in the general domain, or over a specific link. For example, if a distributed application instance registers with messaging infrastructure 1102 and informs that the distributed application instance will use a particular IP address for the distributed application instance's data communications, messaging infrastructure 1102 can determine from the membership information that adapter "A", which is associated with the requested IP address, will be in use for the distributed application instance. Accordingly, adaptive component 1108 can throttle back (reduce) the diagnostic heartbeating on the links involving adapter "A" to provide more bandwidth for the distributed application instance's use.

A change of heartbeating frequency by the sender, throttling or speed-up, implies a change of expected heartbeat frequency in the receivers. In one embodiment, this frequency change is communicated by a distributed protocol among the sender and all receivers. In another embodiment, the frequency change relies on the receivers changing the maximum timeout for which to tolerate not receiving a heartbeat of given type adaptively. For example, when the network is congested, and a sending thread cannot execute at the expected rate, adaptive change of maximum timeout is a gradual process such that a receiving adapter can observe the network conditions to automatically increase or decrease the timeout.

As another example, adaptive component 1108 can combine several diagnostic heartbeat packets together to reduce the frequency of diagnostic heartbeating. As an example, several diagnostic heartbeat packets can be combined by combining the diagnostic attributes of the several diagnostic heartbeat packets into one diagnostic heartbeat packet, combining the data payload to ensure that the combined data payload of the one diagnostic heartbeat packet meets the diagnostic requirements of the combined diagnostic heartbeat packets.

Adaptive component 1108 can implement frequency throttling and diagnostic heartbeat packet combining techniques together or in some combination to provide desired service levels from the member components. Furthermore, adaptive component 1108 can employ logic to adapt the diagnostic heartbeating not only according to the registrations, subscriptions, and current state information, but also based on historical state information 1110. For example, historical state information 1110 may reveal that between 12 AM and 2 AM each night, a distributed instance of a database on a particular node in the domain sends a large volume of data traffic to adapter "A", perhaps as the database performs a nightly backup. Adaptive component 1108 can reduce the frequency of diagnostic heartbeating to or from adapter A during that period to minimize the degradation of adapter A's performance. As another example, in an embodiment, adaptive component 1108 monitors a workload queue, such as a scheduler's job queue or a device driver's send queue, to anticipate a change in utilization of a member component. Adaptive component 1108 can increase or decrease the frequency of diagnostic heartbeating according to the direction of the utilization change, if the change does occur.

The embodiments improve certain components of a reliable peer-to-peer communication system in different ways. For any given component, not all improvements are necessary to practice any particular embodiment. For example, an implementation of a messaging infrastructure may include any suitable combination of the different features of the different configurations of messaging infrastructure as described in different embodiments herein within the scope of the invention.

Figure 12:
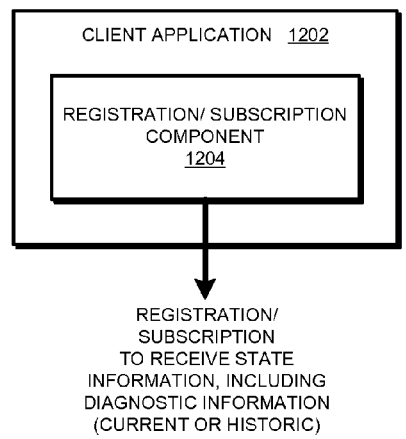
FIG. 12 depicts a block diagram of an improved client application in accordance with an illustrative embodiment.

With reference to FIG. 12, this figure depicts a block diagram of an improved client application in accordance with an illustrative embodiment. Client application 1202 may be usable as client application 902 in FIG. 9.

Client application 1202 includes registration and subscription component 1204. Component 1204 sends the registration or subscription for receiving all or a subset of the state information about the domain members. As described elsewhere in this disclosure, component 1204 may prepare and send a registration to an improved messaging infrastructure of an embodiment to receive the current or historic state information, including diagnostic information, about the domain members. As also described elsewhere in this disclosure, component 1204 may prepare and send a subscription to an improved messaging infrastructure of an embodiment to receive specific current or historic state information, including diagnostic information, about specific domain members.

Figure 13:
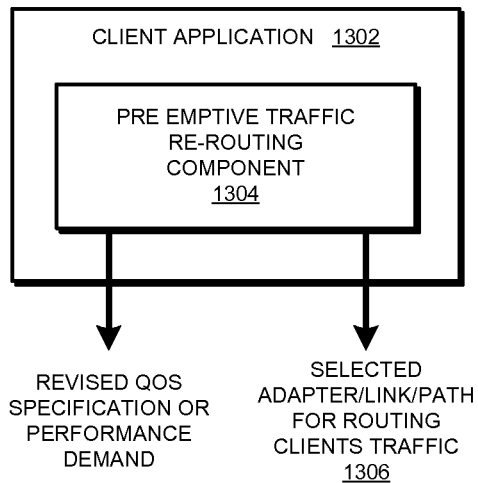
FIG. 13 depicts a block diagram of an improved client application in accordance with an illustrative embodiment.

With reference to FIG. 13, this figure depicts a block diagram of an improved client application in accordance with an illustrative embodiment. Client application 1302 may be usable as client application 1202 in FIG. 12.

Client application 1302 includes preemptive traffic re-routing component 1304. Component 1304 uses the state information and associated diagnostic information received in response to a registration or subscription to determine current or historical patterns of soft network errors. Using the information determined about the soft network errors, component 1304 can send a revised QoS specification or performance demand to a messaging infrastructure to ensure that the domain components currently experiencing or likely to experience soft network errors are avoided. Alternatively, to achieve a similar result, component 1304 can send a request to the messaging infrastructure to route client application 1302's data traffic to selected adapter, link, or path 1306.

Figure 14:
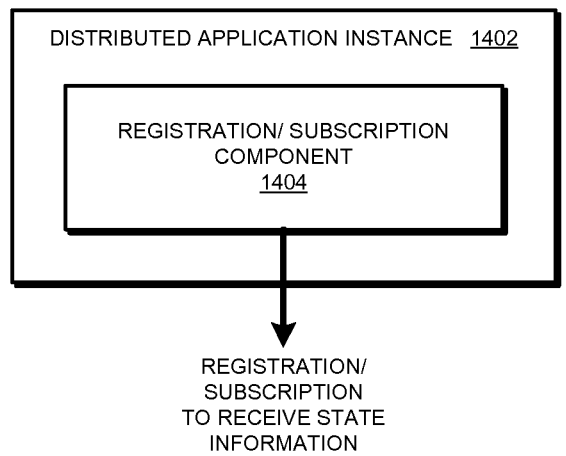
FIG. 14 depicts a block diagram of an improved distributed application instance in accordance with an illustrative embodiment.

With reference to FIG. 14, this figure depicts a block diagram of an improved distributed application instance in accordance with an illustrative embodiment. Distributed application instance 1402 may be usable as distributed application instance 904 in FIG. 9.

Distributed application instance 1402 includes registration and subscription component 1404. Component 1404 sends the registration or subscription for receiving all or a subset of the state information about the domain members. As described elsewhere in this disclosure, component 1404 may prepare and send a registration to an improved messaging infrastructure of an embodiment to receive the current or historic state information, including diagnostic information, about the domain members. As also described elsewhere in this disclosure, component 1404 may prepare and send a subscription to an improved messaging infrastructure of an embodiment to receive specific current or historic state information, including diagnostic information, about specific domain members.

Figure 15:
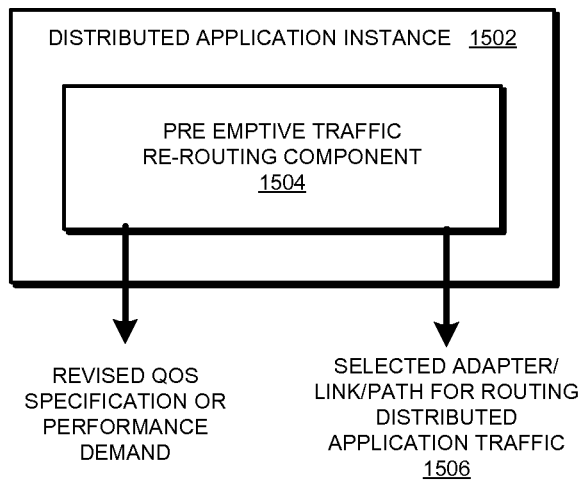
FIG. 15 depicts a block diagram of an improved distributed application instance in accordance with an illustrative embodiment.

With reference to FIG. 15, this figure depicts a block diagram of an improved distributed application instance in accordance with an illustrative embodiment. Distributed application instance 1502 may be usable as distributed application instance 1402 in FIG. 14.

Distributed application instance 1502 includes preemptive traffic re-routing component 1504. Component 1504 uses the state information and associated diagnostic information received in response to a registration or subscription to determine current or historical patterns of soft network errors. Using the information determined about the soft network errors, component 1504 can send a revised QoS specification or performance demand to an improved messaging infrastructure of an embodiment to ensure that the domain components currently experiencing or likely to experience soft network errors are avoided. Alternatively, to achieve a similar result, component 1504 can send a request to the messaging infrastructure to route distributed application instance 1502's data traffic to selected adapter, link, or path 1506.

Figure 16:
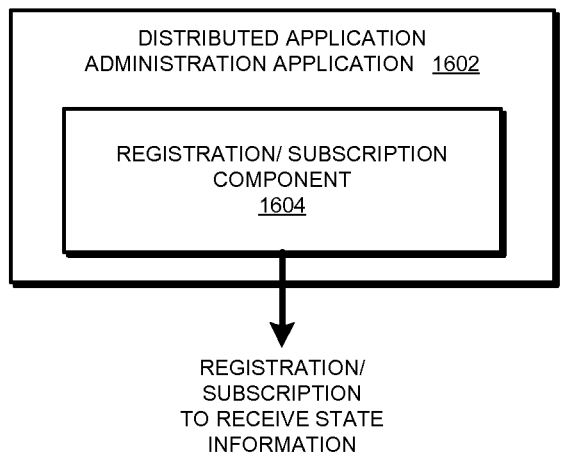
FIG. 16 depicts a block diagram of an improved administration application for administrating distributed applications in accordance with an illustrative embodiment.

With reference to FIG. 16, this figure depicts a block diagram of an improved administration application for administrating distributed applications in accordance with an illustrative embodiment. Administration application 1602, which is an example of administration application 103 in FIG. 1, may register with or subscribe to a messaging infrastructure in a manner similar to client application 902 in FIG. 9.

Administration application 1602 includes registration and subscription component 1604. Component 1604 sends the registration or subscription for receiving all or a subset of the state information about the domain members. As described elsewhere in this disclosure, component 1604 prepares and sends a registration to an improved messaging infrastructure of an embodiment to receive the current or historic state information, including diagnostic information, about the domain members. As also described elsewhere in this disclosure, component 1604 prepares and sends a subscription to an improved messaging infrastructure of an embodiment to receive specific current or historic state information, including diagnostic information, about specific domain members.

Figure 17:
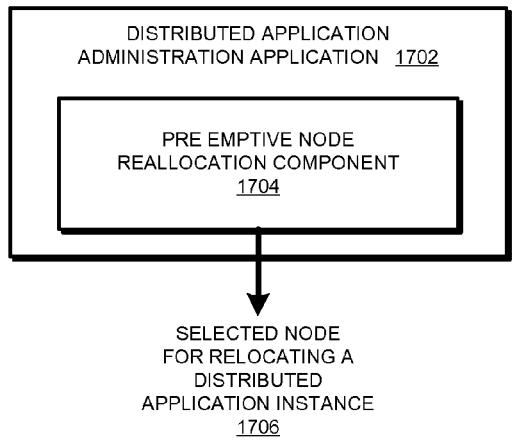
FIG. 17 depicts a block diagram of an improved administration application for administrating distributed applications in accordance with an illustrative embodiment.

With reference to FIG. 17, this figure depicts a block diagram of an improved administration application for administrating distributed applications in accordance with an illustrative embodiment. Administration application 1702 uses an improved messaging infrastructure of an embodiment in a manner similar to client application 902 in FIG. 9. Administration application 1702, which is an example of administration application 103 in FIG. 1, may be usable as administration application 1602 in FIG. 16.

Administration application 1702 includes preemptive node reallocation component 1704. Component 1704 uses the state information and associated diagnostic information received in response to a registration or subscription to determine current or historical patterns of soft network errors. Using the information determined about the soft network errors, component 1704 can relocate a distributed application instance under its administration to another node 1706 in the domain to ensure that the domain components currently experiencing or likely to experience soft network errors are avoided. Alternatively, to achieve a similar result, component 1704 can send a request (not shown) to the messaging infrastructure to route an affected distributed application instance's data traffic to a selected adapter, link, or path.

Figure 18:
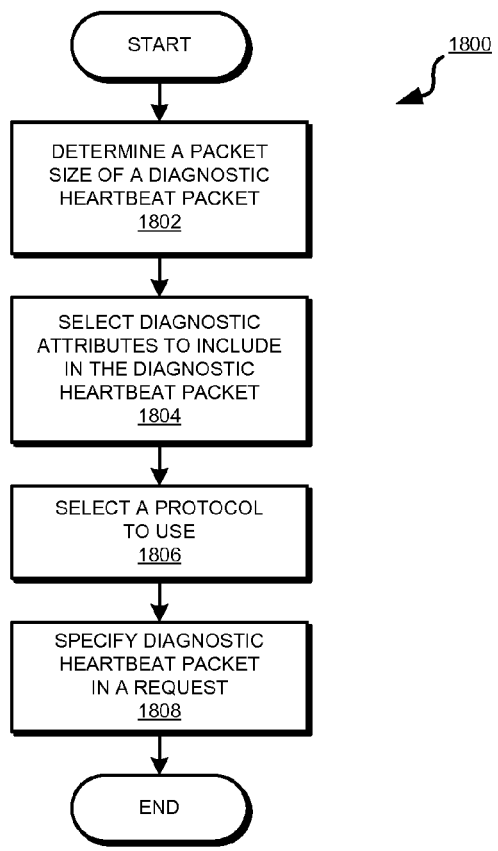
FIG. 18 depicts a flowchart of an example process of specifying a diagnostic heartbeat packet in accordance with an illustrative embodiment.

With reference to FIG. 18, this figure depicts a flowchart of an example process of specifying a diagnostic heartbeat packet in accordance with an illustrative embodiment. Process 1800 may be implemented in a component of an improved messaging infrastructure of an embodiment, such as in heartbeating component 706 in FIG. 7.

The component determines a packet size of a diagnostic heartbeat packet (block 1802). The component selects a set of diagnostic attributes to include in the diagnostic heartbeat packet (block 1804). The component selects a protocol to use for transmitting the diagnostic heartbeat packet (block 1806). The component specifies the diagnostic heartbeat packet to be constructed in a request (block 1808). Process 1800 ends thereafter.

The determinations and selections of blocks 1802, 1804, and 1806 can be used in any combination within the scope of an embodiment. For example, within the scope of the illustrative embodiments, a particular implementation may omit selecting a protocol, allowing a default protocol type to be used instead. Furthermore, an implementation may add an additional step of specifying the values of a subset of the set of diagnostic attributes and allowing a default value selection for the other remaining diagnostic attributes in the set. A set of diagnostic attributes is one or more diagnostic attributes.

Figure 19A:
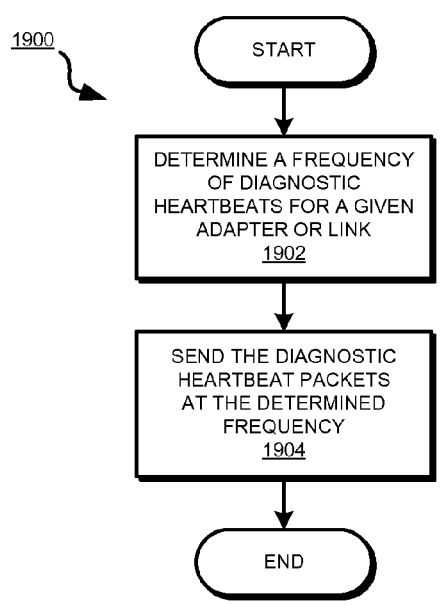
FIG. 19A depicts a flowchart of an example process of throttling diagnostic heartbeating in accordance with an illustrative embodiment.

With reference to FIG. 19A, this figure depicts a flowchart of an example process of throttling diagnostic heartbeating in accordance with an illustrative embodiment. Process 1900 may be implemented in a component of a messaging infrastructure, such as in adaptive component 1108 in FIG. 11.

The component determines a frequency of diagnostic heartbeats for a given adapter or a link (block 1902). For example, the component may select the frequency to reduce the overhead caused by the diagnostic heartbeat packets on a link for which a client application has indicated a preference. The component sends the diagnostic heartbeat packets at the selected frequency on the given adapter or link (block 1904). Process 1900 ends thereafter. The frequency change may be communicated by a distributed protocol among the sender and receivers, or a receiver may change the maximum timeout for which to tolerate not receiving a heartbeat of given type adaptively as described earlier.

Figure 19B:
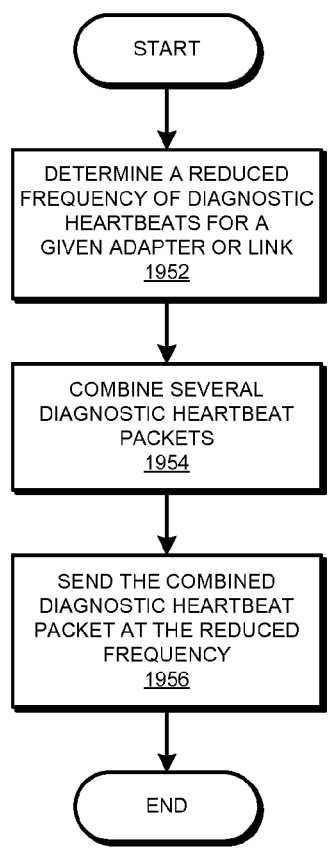
FIG. 19B depicts a flowchart of another example process of throttling diagnostic heartbeating in accordance with an illustrative embodiment.

With reference to FIG. 19B, this figure depicts a flowchart of another example process of throttling diagnostic heartbeating in accordance with an illustrative embodiment. Process 1950 may be implemented in a component of a messaging infrastructure, such as in adaptive component 1108 in FIG. 11.

The component determines a reduced frequency of diagnostic heartbeats for a given adapter or a link (block 1952). The component combines several diagnostic heartbeat packets into a single diagnostic heartbeat packet (block 1954). The component sends the combined diagnostic heartbeat packet at the reduced frequency on the given adapter or link (block 1956). Process 1950 ends thereafter. The frequency change may be communicated by a distributed protocol among the sender and receivers, or a receiver may change the maximum timeout for which to tolerate not receiving a heartbeat of given type adaptively as described earlier.

Figure 20:
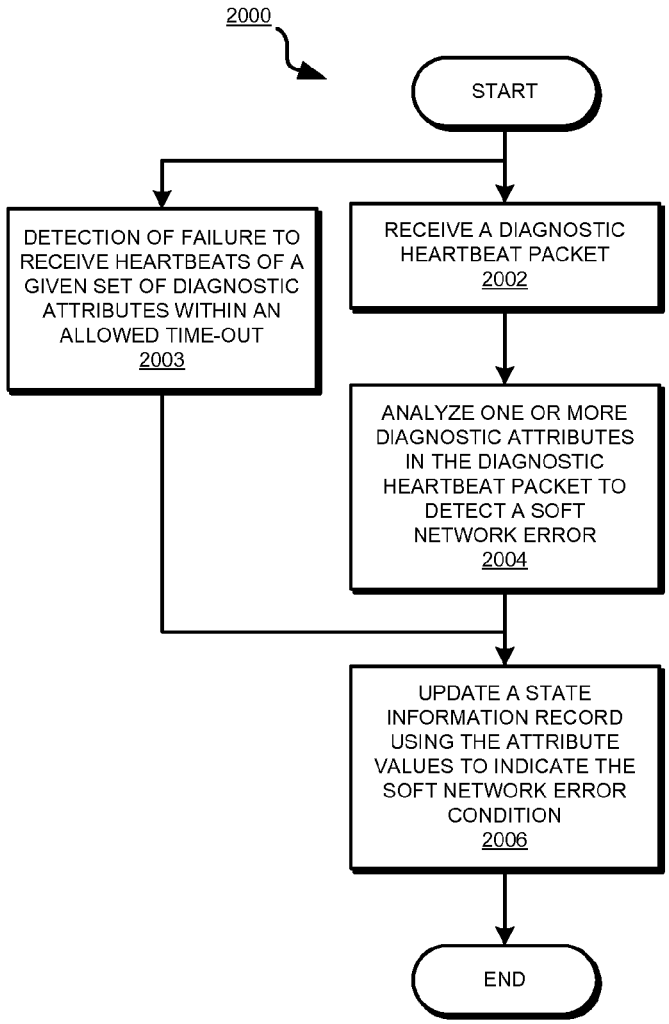
FIG. 20 depicts a flowchart of an example process of detecting a soft network error condition in accordance with an illustrative embodiment.

With reference to FIG. 20, this figure depicts a flowchart of an example process of detecting a soft network error condition in accordance with an illustrative embodiment. Process 2000 may be implemented in a component of an improved messaging infrastructure of an embodiment, such as in heartbeating component 706 in FIG. 7.

The component receives a diagnostic heartbeat packet (block 2002). The component analyzes one or more diagnostic attributes in the diagnostic heartbeat packet to detect a soft network error (block 2004). Based on the analysis, the component updates a state information record using the diagnostic attribute values to indicate the soft network error condition (block 2006). Process 2000 ends thereafter.

In one embodiment, the component analyzes the header information in the diagnostic heartbeat packet to determine a source, a target, and certain diagnostic attributes. The component then compares the diagnostic attributes with corresponding diagnostic attributes stored in the state information record for the link from adapter A to adapter B. Based on the analysis, block 2006 may update the state information record, such as when the value for a particular diagnostic attribute reflects an improvement in a condition of the link between adapters A and B. Thus, the component can detect not only soft network error conditions, but also network condition improvements using the diagnostic heartbeats.

As another example, assume that a diagnostic heartbeat packet of size 4 KB was sent over UDP from adapter A to adapter B but the state information record contains a length of 2K as largest value for which there exists connectivity for UDP packets sent from adapter A to adapter B. The component can update the state information record with the new value of 4 KB for protocol type UDP and the link from adapter A to adapter B. As another example, the diagnostic attributes may indicate a bit pattern that is not yet stored in the state information record for the link from adapter A to adapter B. The component, at block 2006, can update the state information record to add information indicating that there exists connectivity with regards to the bit pattern.

Alternatively, under certain circumstances, at the beginning of process 2000, the component may detect a failure to receive, within an allowed time-out, diagnostic heartbeats having a given set of diagnostic attributes (block 2003). Generally, the maximum time-out value for which to tolerate a failure to send receive heartbeats before declaring a failure of connectivity is specific to the given set of attributes incorporated in the diagnostic heartbeat. For example, the component may detect that no diagnostic heartbeat of the set of attributes consisting of packet size and UDP protocol type has been received for a time period exceeding the maximum allowed time-out specific to that pair of attributes.

Following block 2003, the component omits block 2004 and proceeds to execute block 2006. Process 2000 ends thereafter. For the above example, the component may update the state information record for a link from adapter A to adapter B to reflect loss of connectivity with regards to the currently stored attribute value for packet size and protocol type UDP.

In an embodiment, process paths 2003-2006 and 2002-2004-2006 operate in conjunction to update the state information record, such as for the example link from adapter A to adapter B, to ensure that the record contains the maximum values of the diagnostic attributes for which diagnostic heartbeat transmission from adapter A to adapter B is successful. In the embodiment, the link is considered to be adversely affected by a soft network error, if at least one attribute in the state information record is not set at a corresponding maximum value. For example, if the embodiment tests the link from adapter A to adapter B for packet transmissions with a size up to 8 KB for packet type UDP, and the value stored in the state information record for attributes packet size and UDP is 4 KB, then the link from adapter A to adapter B is deemed to be adversely affected by a soft network error.

With reference to FIG. 21, this figure depicts a flowchart of an example process of historically tracking soft network error conditions in a distributed domain in accordance with an illustrative embodiment. Process 2100 may be implemented in a component of a messaging infrastructure, such as in heartbeating component 706 in FIG. 7.

The component receives diagnostic heartbeat packets from the various member adapters and other domain member components (block 2102). The component updates the state information of the adapters and other member components based on the diagnostic attribute values found in the diagnostic heartbeat packets (block 2104). The component adds the updated state information to a historical record of the state information of those adapters and other member components (block 2106). Process 2100 ends thereafter.

With reference to FIG. 22, this figure depicts a flowchart of an example process of registration or subscription in accordance with an illustrative embodiment. Process 2200 may be implemented in an improved messaging infrastructure, such as in messaging infrastructure 1102 in FIG. 11.

The improved messaging infrastructure receives from a client application or a distributed application instance a registration to receive state information available in the improved messaging infrastructure (block 2202). The improved messaging infrastructure may additionally or alternatively also receive from a client application or a distributed application instance a subscription to receive specific state information updates available in the improved messaging infrastructure (block 2204). A distributed application instance administration application may also send a registration or a subscription in a similar manner.

The improved messaging infrastructure provides the requested state information to the requesting entity (block 2206). The improved messaging infrastructure may additionally adjust a diagnostic heartbeating frequency according to the registration or subscription information (block 2208). For example, the improved messaging infrastructure may reduce the diagnostic heartbeating frequency on an adapter to which a distributed application instance has subscribed, as a preemptive move to reduce overhead on an adapter that is likely to be used in the near future. As another example, if a particular link or adapter is not subscribed to, the improved messaging infrastructure may opportunistically increase the diagnostic activity on such a link in anticipation of low utilization in the near future.

Conversely, under some circumstances, the reverse operation may be desirable. For example, the improved messaging infrastructure may increase the diagnostic activity on a link that is subscribed to detect any soft network errors that could adversely affect the busy link, and vice versa. The adjusted frequency may serve as an input to the adaptive component of the improved messaging infrastructure as described elsewhere in this disclosure. Process 2200 ends thereafter.

With reference to FIG. 23, this figure depicts a flowchart of an example process of soft network error condition aware data routing in accordance with an illustrative embodiment. Process 2300 may be implemented in an improved messaging infrastructure, such as in messaging infrastructure 1100 in FIG. 11.

The improved messaging infrastructure receives a request selecting an adapter or a link on which to place the requestor's data traffic (block 2302). In one embodiment, the request in block 2302 may be for selecting a node on which to locate or relocate a distributed application instance.

The improved messaging infrastructure configures the data routing information so that the traffic of the requestor may be routed to the desired adapter or link (block 2304). When the request is to relocate a distributed application instance to a node, the improved messaging infrastructure may configure the routing information so that the data traffic to and from the distributed application instance can be realized at the requested node.

The improved messaging infrastructure may additionally adjust a diagnostic heartbeating frequency according to the reallocation of data traffic to the specific adapter, link, or node (block 2306). For example, the improved messaging infrastructure may reduce the diagnostic heartbeating frequency on the selected adapter, link, or node so as to reduce the overhead on now busier adapter, link, or node. The reduced frequency may serve as an input to the adaptive component of the improved messaging infrastructure as described elsewhere in this disclosure. Process 2300 ends thereafter.

Figure 24:
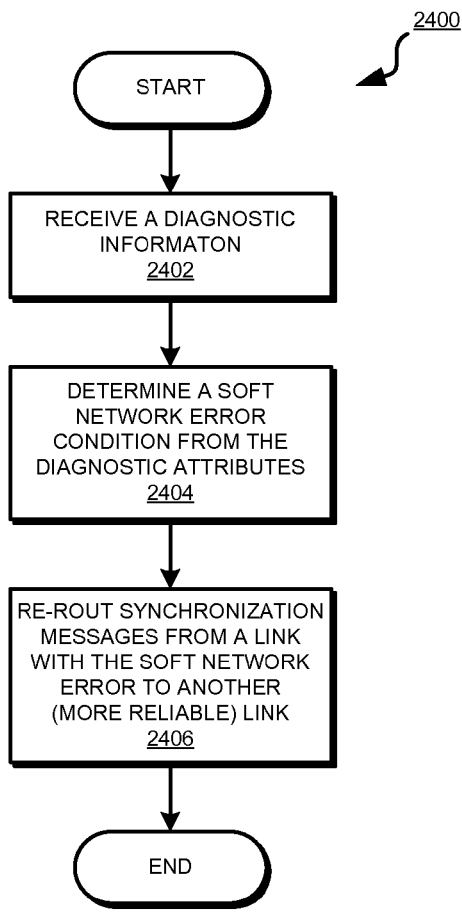
FIG. 24 depicts a flowchart of an example process of circumventing a soft network error condition in accordance with an illustrative embodiment.

With reference to FIG. 24, this figure depicts a flowchart of an example process of circumventing a soft network error condition in accordance with an illustrative embodiment. Process 2400 may be implemented in a component of an improved messaging infrastructure of an embodiment, such as in reliable messaging component 1008 in FIG. 10.

The component receives diagnostic information, such as from a state information record that stores performance metrics and soft network error condition indicators as described elsewhere in the disclosure (block 2402). The component determines, such as by analyzing the diagnostic attributes available from the state information record, that a soft network error condition exists in the domain (block 2404).

Note that what may not be a soft network error condition for one purpose may be a soft network error condition for another purpose. For example, if a distributed application instance never uses UDP, and never subscribes to protocol related diagnostics from an improved messaging infrastructure of an embodiment, as far as the distributed application instance is concerned, no soft network error condition exists in the domain. A different analysis, such as for process 2400, which may utilize UDP, may reveal that a soft network error condition does exist because the second analysis utilizes the protocol diagnostics.

The component re-routes the synchronization messages from a link with the soft network error to another, more reliable, link (block 2406). Process 2400 ends thereafter.

Figure 25:
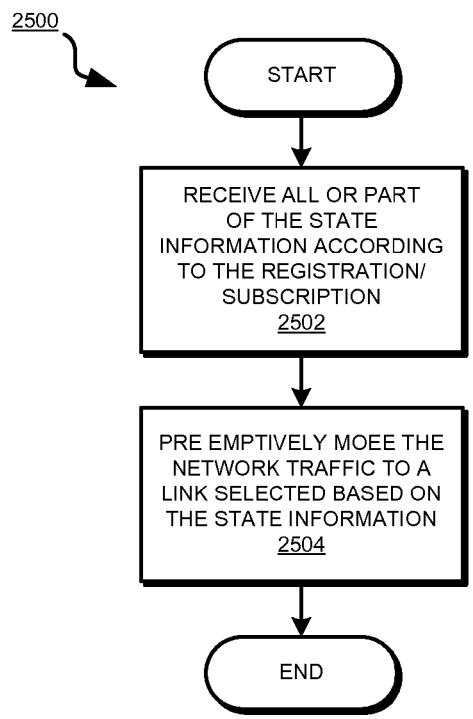
FIG. 25 depicts a flowchart of another example process of circumventing a soft network error condition in accordance with an illustrative embodiment.

With reference to FIG. 25, this figure depicts a flowchart of another example process of circumventing a soft network error condition in accordance with an illustrative embodiment. Process 2500 may be implemented in a client application, such as in preemptive traffic re-routing component 1304 in FIG. 13. Process 2500 may also be implemented in a distributed application instance, such as in preemptive traffic re-routing component 1504 in FIG. 15.

The component receives all or part of the state information according to a registration or subscription (block 2502). The component detects a soft network error condition using the received state information and preemptively moves the network traffic of the associated client application or distributed application instance to a member component, such as a link, selected based on the received state information (block 2504). Process 2500 ends thereafter.

Figure 26:
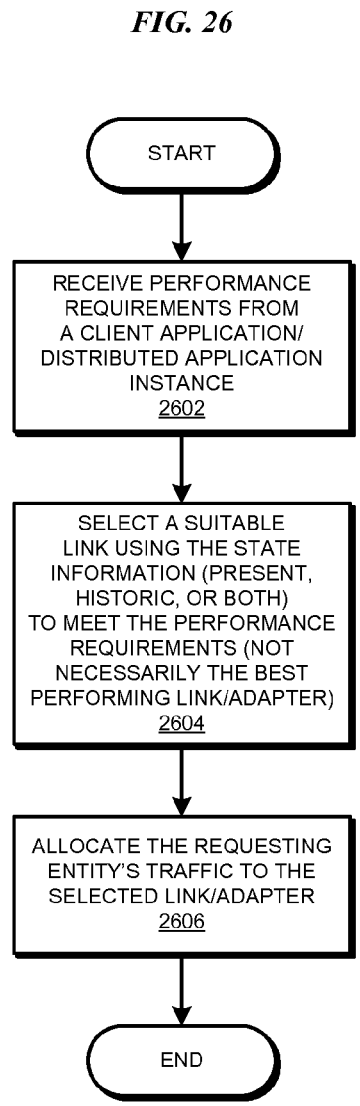
FIG. 26 depicts a flowchart of another example process of mitigating the effects of a soft network error condition in accordance with an illustrative embodiment.

With reference to FIG. 26, this figure depicts a flowchart of another example process of mitigating the effects of a soft network error condition in accordance with an illustrative embodiment. Process 2600 may be implemented in an improved messaging infrastructure, such as in messaging infrastructure 1102 in FIG. 11.

The improved messaging infrastructure receives performance requirements, such as QoS specifications, from a client application or a distributed application instance (block 2602). The improved messaging infrastructure selects a suitable member component of the domain, such as a suitable adapter or link, using a combination of the current and the historical state information, to meet the performance requirements (block 2604). The selection of block 2604 need not necessarily select the best performing member component but a component of suitable performance and availability to satisfy the performance requirements received in block 2602.

The improved messaging infrastructure allocates the requesting entity's traffic to the selected member component (block 2606). Process 2600 ends thereafter.

Figure 27:
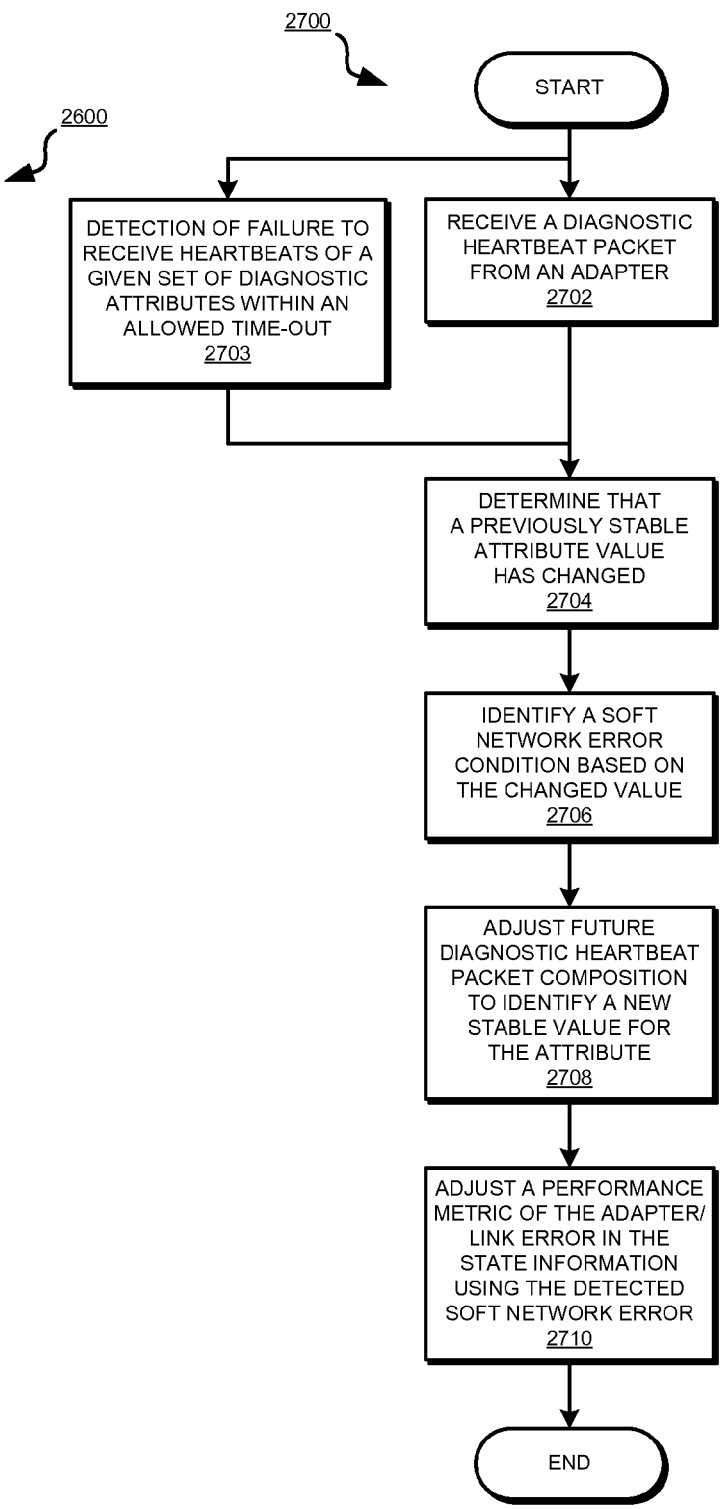
FIG. 27 depicts a flowchart of another example process of detecting a soft network error condition and mitigating the error's effects in accordance with an illustrative embodiment.

With reference to FIG. 27, this figure depicts a flowchart of another example process of detecting a soft network error condition and mitigating the error's effects in accordance with an illustrative embodiment. Process 2700 may be implemented in an improved messaging infrastructure, such as in messaging infrastructure 1102 in FIG. 11.

In one embodiment, the improved messaging infrastructure receives a diagnostic heartbeat packet from an adapter (block 2702). In another embodiment, the improved messaging infrastructure detects a failure to receive diagnostic heartbeats having a given set of diagnostic attributes within an allowed time-out (block 2703). Several methods to detect a failure of a diagnostic heartbeat have been described with respect to block 2003 in FIG. 20, and are similarly applicable for executing block 2703.

Using the received diagnostic heartbeat packet of block 2702, or based on the failure to receive the diagnostic heartbeat packet as in block 2703, the improved messaging infrastructure determines that a previously stable value of a diagnostic attribute has changed (block 2704). The improved messaging infrastructure identifies a soft network error condition based on the changed value (block 2706). The improved messaging infrastructure adjusts a future diagnostic heartbeat packet to identify a new stable value of the diagnostic attribute (block 2708). The improved messaging infrastructure adjusts or updates a performance metric of the adapter, links associated with the adapter, or both, in the state information using the detected soft network error condition (block 2710). Process 2700 ends thereafter.

The operation of process 1800, 1900, 1950, 2000, and 2700, and other operations using diagnostic heartbeat packets as described herein are now described with respect to an example implementation. The details of the example implementation are not intended to be limiting on the illustrative embodiments. Those of ordinary skill in the art will be able to conceive other implementation details, variations, or additions thereto. Such modifications are contemplated within the scope of the illustrative embodiments.

1. Logical Subnet Partition of a Domain, Heartbeat Signature and Tunables

1.A) Adapters of a domain are divided into logical subnets that reflect physical network connectivity. All adapters of a logical subnet are of the same architecture, for instance Ethernet or Fibre Channel and part of the same physical network.

1.B) A heartbeat signature is a sequence of sets of heartbeat packets H1, . . . , Hn whereby each set Hi has a format specified by a set of attributes, including packet size, protocol type, bit pattern. For a given set Hi, multiple instances of heartbeat signatures may exist with varying attribute values. For example, Hi may be set of UDP packets with bit pattern 1010 . . . 1010 in a range of sizes. A basic heartbeat signature consists of basic heartbeats. As described, these are heartbeats that have invariable attribute values, for instance fixed size. A diagnostic heartbeat signature consists of heartbeats that may have variable attribute values, for instance variable size.

1.C) A heartbeat signature has heartbeat tunables associated with it, in particular:

Tunables for Basic Heartbeat Signature:
Heartbeat Frequency
The frequency with which basic heartbeats are sent, the same frequency for all heartbeats of the signature.
Heartbeat Grace Period
The maximum period for which a basic heartbeat of given attribute may not be received before declaring heartbeat connectivity with regards to that attribute as failed.
Heartbeat Frequency for Auto Discovery of Connectivity for Failed Heartbeats
If for a given basic heartbeat, Hi, heartbeating establishes no connectivity with any recipient, heartbeats Hi need to be sent out periodically to rediscover if connectivity with regards to attribute values of Hi has been restored. Such packets add further network load and a tunable frequency for such packets it desirable.
Tunables for Diagnostics Heartbeat Signature:
Heartbeat Frequency
The frequency with which diagnostic heartbeats are sent, the same frequency for all heartbeats of the signature.
Heartbeat Grace Period
The maximum period for which a diagnostics heartbeat of given attribute value may not be received before declaring heartbeat connectivity with regards to that attribute value as failed.
Heartbeat Frequency for Auto Discovery of Connectivity with Optimal Value for Heartbeats of Degraded Attribute Value
If for a given attribute heartbeating establishes connectivity with a value below the optimal one, heartbeats of higher value need to be sent out periodically to rediscover if connectivity with a higher value has been restored.

1.D) Each logical subnet has multiple heartbeat signatures associated, that may change dynamically. That is, heartbeats on a given subnet are managed with tunables that are not uniform. In particular, heartbeats signatures of the following categories may be active on a subnet:

i.) basic_active—basic signature heartbeats, sent while the path has not been declared as failed ii.) basic_retry—basic signature heartbeats, sent to retry the connection after detected failure iii.) diag_active—diagnostics signature heartbeats, sent with dynamic attributes while the path has not been declared as failed with regards to these attributes iv.) diag_retry—diagnostic heartbeats, retry of attributes after detected failure of connectivity with regards to these attributes 1.E) Heartbeat signatures and tunables may be dynamically changed, such as to react to client demands or increased network bandwidth usage by clients.

1.F) Clients may use different heartbeat signatures and tunables per logical subnet to monitor network properties specific to the intended use of a network connection by an application.

2. Presentation of Adapter State Information

2.A) The membership component of the peer-to-peer communication system implements monitoring for a given set of attributes, attr_1, . . . , attr_n, as described elsewhere in the disclosure. Attributes represent characteristics of heartbeat packets, such as packet size, TCP/IP protocol type or a bit pattern. As stated, multiple attributes may be associated with one heartbeat packet. The value of an attribute is an integer, according to a metric specific to attr_i, for instance packet size, or bit pattern encoded by a number.

2.B) The range of possible values for attributes is not the same for basic heartbeat signatures and diagnostic heartbeat signatures:

Attributes of the basic heartbeat signatures can have values 1 and 0, indicating connectivity or no connectivity with regards to an attribute type which fixes value, such as UDP packets of size 128 bytes.

Attributes of the diagnostic heartbeat signature may have a range of integer values.

2.C) Each adapter, Ai, receives heartbeats from a subset of adapters of the same logical subnet, {Ai1, . . . , Ain}. For each adapter Ail from which Ai receives heartbeats, it maintains a vector of attribute values, attr(Ail)={attr_1(1(Ail)), . . . , attr_k(Ail))}.

2.D) The attribute values attr_j(Ai) are updated according to receipt of heartbeats of the type represented by the attribute and externalized to clients.

3. Presentation of Attribute Specific Network State

State of heartbeat connectivity is broadcast by all listeners and results are stored by each member in the attribute enriched routing table. Routing information can be derived from the connectivity matrix and queries like the below are supported by the API:

3.A) Find adapters in any or a given logical subnet that have connectivity with relation to a given set of attribute values attr_1, . . . , attr_n. For instance, find a set of adapters that are able to exchange packets of minimum size x.

3.B) For a given logical subnet, display attribute values with regards to which connectivity of adapters exists.

4. Embodiment of a Heartbeating Component of Fixed Heartbeating Topology

In the following we outline management of heartbeat attributes and adapter state information in a membership component 4.1 Heartbeating A.) A distinguished heartbeat signature exists that is suited to test basic network connectivity as described earlier. This heartbeat signature contains a sequence of heartbeats of which is assumed that if an adapter is able to receive from a neighbor any heartbeat of a given attribute, then it will be able to receive a subset of heartbeats of H1, . . . , Hn and thus receipt of any heartbeat of that set is proof that the remote adapter is alive. Receiving such distinguished heartbeats can be thought of as a prerequisite to receive other heartbeats and is a mean to detect most accurately if a remote member is alive and hence to deduce most accurately domain membership.

B.) For each logical subnet, three distinguished heartbeat signatures exist, for the following purposes:

B.1) Initialization: When heartbeating is started, for applicable attributes a range of values may be sent such as packets of various size for receivers to be able to determine a maximum packet size.

B.2) Heartbeating: The signature for heartbeating that is used once a stable set of network attributes has been established.

B.3) Stabilization after State Change: Once heartbeats of a stable attribute value are no longer received, a heartbeat signature with a variation of value for that attribute is sent, to establish the new maximum value for that attribute.

4.2 Protocols

A.) Initialization—entails mediation of a best possible set of attribute values sent during heartbeating. Attribute values are assumed to be assigned such that the highest value is the best value.

1. Adapter A sends heartbeats according to configured heartbeat signatures basic_active and diag_active to its set of listeners. For a given heartbeat of diag_active, packets with all attribute values are sent.

2. The listeners acknowledge receipt of a heartbeat, Hi, of basic or diagnostic type by sending an ACK back to sender A.

3. Sender A does the following upon receipt of heartbeat ACK responses from listeners:

3.A) Based on the set of attribute values received by senders for which connectivity exists, it forms the four heartbeat signatures described in 1.D, which are called the stable active signature. The diag_active signature may contain for a given heartbeat multiple instances with different attribute values, the maximum for which each listener acknowledged receipt.

3.B) Sender A maintains a list per listener which specifies for which attribute value connectivity exists and based on that builds the retry signatures 1.D.ii and 1.D.iv as follows:

basic_retry—contains heartbeats not in basic_active diag_retry—contains for each heartbeat that has an instance that is not at maximum value for a listener a instance of attribute value one above the current value in diag_active 4. Sender A sends the stable active signature to its set of listeners.

5. Listeners publish the state with regards to monitored attributes to the reliable messaging component and to clients as follows:

Each listener broadcasts values for heartbeat connectivity from the sender, using packets of basic heartbeat format of all applicable attributes.

Each recipient of a broadcast will add that state information to its local network connectivity matrix.

B.) Heartbeating—entails sending heartbeats according to heartbeat signatures in 1.D) that have been determined during initialization. As stated in 1.D) above, not all heartbeats of the collated signature may have the same tunables.

1. Adapter A sends heartbeats signatures as described in 1.D) above with configured frequencies.

2. The recipients listen for heartbeats. If a recipient detects a state change, i.e., either failure to receive a heartbeat for its associated grace period or that the recipient again receives heartbeats with attributes that are not part of the current state signature, the recipient initiates a protocol by notifying sender A.

3. The Stabilization after State Change protocol, described in 4.2.0 below is executed. In response to a change in the network configurations, multiple iterations of described protocol may be executed until a new stable heartbeat signature has been mediated.

C.) Stabilization after State Change

Upon receipt of a notification as described in 4.2.B.2 Sender A will do the following:

1.) If notification that a heartbeat, Hi, of any active heartbeat signature, 4.2.D.1 or 4.2.D.3 is not received, sender A will do the following:

1.A) Update list 4.2.A.3.B

1.B) If Hi belongs to a basic signature, do the following:

If Hi is not received any longer by any listener, Hi will be removed from the basic_active and added to the basic_retry signature.

1.C) If H1 belongs to a diagnostics signature and its attribute value is equal or larger than values for the attribute received by any other listener according to list 4.2.A.3.B, diagnostics heartbeating signatures are changed as follows:

An instance of heartbeat Hi is added with its next lower attribute value in the diag_active signature, or if Hi already had been at its minimum value removed from that signature.

An instance of the as failed detected attribute value of Hi is added to the diag_retry signature.

2.) If response to a heartbeat, Hi, of any retry signature is received with an attribute value that is larger than the currently known value for which connectivity exists, i.e. the value in the per listener and attribute connectivity list described in 4.2.A.3.B, sender A will do the following:

2.A) Update list 4.2.A.3.B

2.B) If Hi belongs to a basic signature, do the following:

Add Hi to basic_active, if not present in that signature.

2.C) If Hi belongs to a diagnostics signature, and its attribute value is equal or smaller than values for the attribute received by any other listener according to list 4.2.A.3.B, diagnostics heartbeating signatures are changed as follows:

An instance of heartbeat Hi is added with next higher attribute value to diag_active, if not already present.

An instance of heartbeat Hi is added with its next higher attribute value to diag_retry, if not already present. If there is no instance of Hi below its maximum value, Hi is removed from that signature.

3. Listeners publish the new state with regards to monitored attributes to the reliable messaging component and to clients as described in 4.2.A.4.

D.) Example of a state transitions in response to a soft network failure

1. Adapter A sends heartbeats with stable signature.
2. Listener Ai and Aj detect a failure to receive diagnostics heartbeats of attribute values
attr_l(Ai)=ail and attr_l(Aj)=ajl.
3. Ai, Aj each send a packet to A, informing of failure to receive the attribute attr_1 with corresponding specified value.
4. A, upon receipt of notifications to receive attribute values ail, ajl, looks up if diag_active contains heartbeats with attribute values one step lower than ail, ajl, called ail_−1, ajl_−1, correspondingly and adds missing ones to the list. Further, A looks up if an instance of each heartbeat with values ail, ajl is in diag_retry and if not adds the instance to the diag-retry.
5. A resumes heartbeating with that signatures.
6. Ai receives heartbeats with the new value ail_−1 and sends an ACK to A.
7. A sends a reply to Ai's ACK.
8. Ai publishes the new attribute ail_−1 for receipt of heartbeats from A to the reliable messaging component and clients.
9. Aj does not receive heartbeats with the new value ajl_−1 and sends a packet to A, informing of failure to receive heartbeats with attribute value ajl_−1.
10. A adds the next lower value for ajl_−1, that is ajl_−2, to the values signature and ajl_−1 to the diag_retry signature.
11. Aj receives the heartbeat with value ajl_−2 and sends an ACK to A.
12. A sends a reply to Aj's ACK.
13. Aj publishes the new attribute ajl_−2 for receipt of heartbeats from A to the reliable messaging component and clients.

4.3 Maintenance of Membership and Logical Adapter State Information

Adapter state information is obtained as a result of receipt of heartbeats with selected signature. Below is an example of externalized adapter state information in raw format:
  adapter: A1
  listeners A11, . . . , A1n
  diagnostics monitored: packet_size, UDP, multicast, TCP, bitpattern_test
  collated diagnostics: (packet size, UDP, bitpattern_test), (packet_size, TCP, bitpattern_test)
  diagnostics range: size: min: 64, max: 8192, bit_pattern cycle size: 2-8192
    values by listeners: A11 A12 . . . A1n
    packet_size (UDP) max 128 . . . max
    bit_pattern (UDP) 1 1 . . . 0
    packet_size (TCP) max 1 . . . 1
    bit_pattern (TCP) 1 1 . . . 0
    tunables: frequency grace-period retry-frequency
    basic: 2 10 8
    diag: 8 32 48

4.4 Use of Adapter State Information by Reliable Messaging Component

The messaging infrastructure specifies monitoring of a set of logical networks it will use to route its traffic and select heartbeat attributes for these networks according to its network traffic characteristics. If a change of network connectivity with regards to monitored attributes affecting the currently used logical subnet has been detected, the reliable messaging layer will switch to use another subnet to route its traffic or for a degradation of certain attributes change its transmission characteristics, such as using smaller size packets.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for diagnostic heartbeating in a distributed data processing environment.

The diagnostics system with the described properties of an embodiment solves important problems in the implementation of reliable peer-to-peer communication systems and distributed clients. Soft network failures occur frequently, and, as described above, they have a pervasive effect on the functionality of distributed middleware, applications, and clients. Failures or mis-configurations are detected and reacted to as soon as they occur, rather than being exposed as random application errors and hangs that are expensive to diagnose via presently available methods. The integrated diagnostics infrastructure greatly reduces the need to localize soft network errors by means of test tools for network hardware, such as network sniffers, and internals knowledge of the client and reliable messaging component.

A network configuration may have been fully functional at some point and a system passed all tests pertaining to reliable peer-to-peer communications before deployment. A simple change in networking, such as replacement of a cable, switch reboot, or change of switch port may introduce a soft network error. In conjunction with the network stress test tool described elsewhere in the disclosure, the described diagnostics embodiments are particularly suited to assess network connectivity before restarting production, thus eliminating downtime. Tunables for maximum bandwidth used for diagnostic heartbeating allow satisfying a range of requirements for performance and latency of failure detection of clients. It is further contemplated that an embodiment can be enhanced with a network stress test tool capable of sending all heartbeat attribute combinations in all ranges that are usable for detecting soft network errors in distributed applications environments.

Furthermore, an embodiment is useful in a cloud environment for Infrastructure as a Service (IaaS) and Platform as a Service (PaaS) providers to comply with Service Level Agreements (SLAs). In a cloud setting networks may span across an inhomogeneous network environment. An embodiment that implements heartbeat construction at lower layer in the network device stack is more effective in diagnosing and reacting to soft network failures as compared to an embodiment that observes network protocol errors in higher layers. Cloud platforms host applications whose network bandwidth characteristics are not necessarily known. A soft network error may be exposed by network load. History information about soft network errors may be used by cloud providers to schedule applications to use certain networks.

An embodiment may be particularly beneficial in detecting soft network errors in low latency data processing environments. For example, in a stock trading or brokerage application, a soft network error can cause a transaction to be delayed, which can result in unacceptable outcome of the transaction. In such low latency environments, predicting soft network errors, or detecting them earlier than presently possible helps meet the stringent service level requirements in those environments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, a set includes one or more members unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for diagnostic heartbeating in a distributed data processing environment, the method comprising:
    a first component, executing using a processor and a memory in a first data processing system, receiving from a second component a set of diagnostic parameters to include in a diagnostic heartbeat packet, wherein the diagnostic heartbeat packet is a packet comprising a header, a set of heartbeat parameters, and the set of diagnostic parameters;
    the first component receiving from the second component information identifying a data communication protocol to be used for transmitting the diagnostic heartbeat packet;
    the first component setting a first diagnostic parameter in the set of diagnostic parameters to a first value, the first value being selected to detect a first soft network error condition, wherein a soft network error condition is a network error condition that reduces performance of a transmission of packets having certain properties in the data communication network;
    the first component configuring the diagnostic heartbeat packet for transmission using the identified data communication protocol and including the set of diagnostic parameters; and
    the first component sending the diagnostic heartbeat packet to the second component.

2. The method of claim 1, further comprising:
    the first component including a header in the diagnostic heartbeat packet; and
    the first component setting an attribute in the header to a second value, the second value of the attribute distinguishing the diagnostic heartbeat packet from a basic heartbeat packet;
    wherein the basic heartbeat packet is a packet that comprises a header and a set of heartbeat parameters and that is devoid of a set of diagnostic attributes.

3. The method of claim 1, further comprising:
    the first component further receiving from the second component a size of the diagnostic heartbeat packet; and
    the first component populating data in a data portion of the diagnostic heartbeat packet such that the diagnostic heartbeat packet achieves the size.

4. The method of claim 1, further comprising:
    the first component further receiving from the second component a bit pattern to include in the diagnostic heartbeat packet; and
    the first component populating data in a data portion of the diagnostic heartbeat packet such that the data includes the bit pattern.

5. The method of claim 1, wherein the first component executes in a user space configured in the memory in the first data processing system.

6. The method of claim 5, wherein the first component executes as a daemon in the user space.

7. The method of claim 1, wherein the first component executes in a kernel space configured in the memory in the first data processing system.

8. The method of claim 7, wherein the first component comprises a device driver integrated with a networking protocol stack.

9. A computer program product for diagnostic heartbeating in a distributed data processing environment, the computer program product comprising:
    one or more computer-readable tangible storage devices;
    program instructions, stored on at least one of the one or more storage devices, to receive from a second component a set of diagnostic parameters to include in a diagnostic heartbeat packet, wherein the diagnostic heartbeat packet is a packet comprising a header, a set of heartbeat parameters, and the set of diagnostic parameters;
    program instructions, stored on at least one of the one or more storage devices, to receive information identifying a data communication protocol to be used for transmitting the diagnostic heartbeat packet;
    program instructions, stored on at least one of the one or more storage devices, to set a first diagnostic parameter in the set of diagnostic parameters to a first value, the first value being selected to detect a first soft network error condition, wherein a soft network error condition is a network error condition that reduces performance of a transmission of packets having certain properties in the data communication network;
    program instructions, stored on at least one of the one or more storage devices, to configure the diagnostic heartbeat packet for transmission using the identified data communication protocol and including the set of diagnostic parameters; and
    program instructions, stored on at least one of the one or more storage devices, to send the diagnostic heartbeat packet.

10. The computer program product of claim 9, further comprising:
    program instructions, stored on at least one of the one or more storage devices, to include a header in the diagnostic heartbeat packet; and
    program instructions, stored on at least one of the one or more storage devices, to set an attribute in the header to a second value, the second value of the attribute distinguishing the diagnostic heartbeat packet from a basic heartbeat packet;
    wherein the basic heartbeat packet is a packet that comprises a header and a set of heartbeat parameters and that is devoid of a set of diagnostic attributes.

11. The computer program product of claim 9, further comprising:
    program instructions, stored on at least one of the one or more storage devices, to receive a size of the diagnostic heartbeat packet; and
    program instructions, stored on at least one of the one or more storage devices, to populate data in a data portion of the diagnostic heartbeat packet such that the diagnostic heartbeat packet achieves the size.

12. The computer program product of claim 9, further comprising:
    program instructions, stored on at least one of the one or more storage devices, to receive a bit pattern to include in the diagnostic heartbeat packet; and program instructions, stored on at least one of the one or more storage devices, to populate data in a data portion of the diagnostic heartbeat packet such that the data includes the bit pattern.

13. The computer program product of claim 9, wherein the program instructions are stored in at least one of the one or more computer-readable tangible storage devices in a data processing system, and wherein the program instructions are transferred over a network from a remote data processing system.

14. The computer program product of claim 9, wherein the program instructions are stored in at least one of the one or more computer-readable tangible storage devices in a server data processing system, and wherein the program instructions are downloaded over a network to a remote data processing system for use in a computer-readable tangible storage device associated with the remote data processing system.

15. A computer system for diagnostic heartbeating in a distributed data processing environment, the computer system comprising:
- one or more processors, one or more computer-readable memories and one or more computer-readable tangible storage devices;
- program instructions, stored on at least one of the one or more storage devices for execution by at least one of the one or more processors via at least one of the one or more memories, to receive from a second component a set of diagnostic parameters to include in a diagnostic heartbeat packet, wherein the diagnostic heartbeat packet is a packet comprising a header, a set of heartbeat parameters, and the set of diagnostic parameters;
- program instructions, stored on at least one of the one or more storage devices for execution by at least one of the one or more processors via at least one of the one or more memories, to receive information identifying a data communication protocol to be used for transmitting the diagnostic heartbeat packet;
- program instructions, stored on at least one of the one or more storage devices for execution by at least one of the one or more processors via at least one of the one or more memories, to set a first diagnostic parameter in the set of diagnostic parameters to a first value, the first value being selected to detect a first soft network error condition, wherein a soft network error condition is a network error condition that reduces performance of a transmission of packets having certain properties in the data communication network;
- program instructions, stored on at least one of the one or more storage devices for execution by at least one of the one or more processors via at least one of the one or more memories, to configure the diagnostic heartbeat packet for transmission using the identified data communication protocol and including the set of diagnostic parameters; and
- program instructions, stored on at least one of the one or more storage devices for execution by at least one of the one or more processors via at least one of the one or more memories, to send the diagnostic heartbeat packet.

16. The computer system of claim 15, further comprising:
- program instructions, stored on at least one of the one or more storage devices for execution by at least one of the one or more processors via at least one of the one or more memories, to include a header in the diagnostic heartbeat packet; and
- program instructions, stored on at least one of the one or more storage devices for execution by at least one of the one or more processors via at least one of the one or more memories, to set an attribute in the header to a second value, the second value of the attribute distinguishing the diagnostic heartbeat packet from a basic heartbeat packet wherein the basic heartbeat packet is a packet that comprises a header and a set of heartbeat parameters and that is devoid of a set of diagnostic attributes.

* * * * *